United States Patent
Tsuboi

(10) Patent No.: US 9,679,236 B2
(45) Date of Patent: Jun. 13, 2017

(54) IC CARD, PORTABLE TERMINAL, AND PORTABLE ELECTRONIC APPARATUS

(71) Applicant: Kabushiki Kaisha Toshiba, Tokyo (JP)

(72) Inventor: Tomomi Tsuboi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/848,689

(22) Filed: Sep. 9, 2015

(65) Prior Publication Data

US 2016/0071001 A1 Mar. 10, 2016

(30) Foreign Application Priority Data

Sep. 9, 2014 (JP) ................................. 2014-183089
Sep. 9, 2014 (JP) ................................. 2014-183469

(51) Int. Cl.
*G06K 7/00* (2006.01)
*G06K 19/07* (2006.01)
(Continued)

(52) U.S. Cl.
CPC ....... *G06K 19/0723* (2013.01); *G06K 7/0004* (2013.01); *G06K 19/073* (2013.01);
(Continued)

(58) Field of Classification Search
CPC ......... G06K 19/0723; G06K 19/07769; G06K 7/0004
See application file for complete search history.

(56) References Cited

U.S. PATENT DOCUMENTS 4,939,353 A * 7/1990 Iijima ................. G06F 11/2221
235/380
6,411,200 B1 * 6/2002 Kawagishi ........... G06K 7/0004
235/380
(Continued)

FOREIGN PATENT DOCUMENTS

EP 2053826 4/2009
JP 2005-050381 A 2/2005
(Continued)

OTHER PUBLICATIONS

English Translation of JP 2007011419; Retrieved Jul. 22, 2016.*
(Continued)

*Primary Examiner* — Christopher Stanford
(74) *Attorney, Agent, or Firm* — Baker Botts L.L.P.

(57) ABSTRACT

An IC card includes a communication unit and a controller. The communication unit can communicate with one communication destination by a plurality of interfaces including a first interface and a second interface. The controller processes a command received by the communication unit, and makes the communication unit transmit a response to the command. In a case where the first interface becomes unavailable after the communication unit receives the command by the first interface until the communication unit transmits the response to the command, the controller makes the communication unit transmit a response containing discontinuation information indicating that the transmission of the response to the command received by the first interface is discontinued by the second interface.

4 Claims, 10 Drawing Sheets

(51) Int. Cl.
*G06K 19/073* (2006.01)
*G06K 19/077* (2006.01)
*G06K 19/08* (2006.01)

(52) U.S. Cl.
CPC ... *G06K 19/0775* (2013.01); *G06K 19/07743* (2013.01); *G06K 19/07769* (2013.01); *G06K 19/08* (2013.01); *G06K 19/07766* (2013.01)

(56) References Cited

U.S. PATENT DOCUMENTS

| | | | |
|---|---|---|---|
| 6,641,045 B1* | 11/2003 | Kuriyama | G06F 11/27 235/379 |
| 7,464,864 B2* | 12/2008 | Kang | H04L 63/0853 235/380 |
| 9,407,328 B2* | 8/2016 | Charrat | G06K 19/07769 |
| 2005/0223143 A1 | 10/2005 | Kang et al. | |
| 2006/0206343 A1* | 9/2006 | Nakanishi | G06K 7/10297 718/102 |
| 2007/0095924 A1 | 5/2007 | Degauque et al. | |
| 2007/0194134 A1 | 8/2007 | Shin et al. | |
| 2008/0000989 A1* | 1/2008 | Chen | G06K 19/07 235/492 |
| 2009/0177819 A1 | 7/2009 | Kang | |
| 2010/0167650 A1 | 7/2010 | Ueda et al. | |
| 2011/0253285 A1 | 10/2011 | Ichikawa et al. | |
| 2015/0310233 A1* | 10/2015 | Kwak | G06K 19/07766 235/437 |

FOREIGN PATENT DOCUMENTS

| | | | |
|---|---|---|---|
| JP | 2005-216234 A | 8/2005 | |
| JP | 2005-275457 A | 10/2005 | |
| JP | 2007011419 | * 1/2007 | G06K 19/07 |
| JP | 2007-257543 A | 10/2007 | |
| JP | 2011-253285 A | 12/2011 | |
| JP | 2012-093856 A | 5/2012 | |
| WO | 2007094624 A1 | 8/2007 | |

OTHER PUBLICATIONS

Extended European Search Report issued in related EU application No. 15184258.0, mailed on Feb. 4, 2016 (8 pages).

Office Action issued in related Singapore patent application No. 10201507295R, mailed on Feb. 11, 2016 (12 pages).

* cited by examiner

IC CARD, PORTABLE TERMINAL, AND PORTABLE ELECTRONIC APPARATUS

CROSS-REFERENCE TO RELATED APPLICATIONS

This application is based upon and claims the benefit of priority from Japanese Patent Application No. 2014-183089, filed on Sep. 9, 2014, and Japanese Patent Application No. 2014-183469, filed on Sep. 9, 2014; the entire content of which are incorporated herein by reference.

FIELD

Embodiments disclosed herein relate generally to an IC card, a portable terminal, and a portable electronic apparatus.

BACKGROUND

In recent years, there has been known an IC card which includes a plurality of interfaces. The conventional IC card receives a command through an interface, executes a process of the received command, and transmits a response through the same interface as the interface that received the command.

Even though the conventional IC card includes the plurality of interfaces, the plurality of interfaces is not effectively used.

DESCRIPTION OF EMBODIMENTS

A conventional IC card includes a plurality of interfaces, but does not effectively use the plurality of interfaces. For example, in a case where an interface receiving a command becomes unavailable for some reasons, the conventional IC card is unable to inform the outside that the interface becomes unavailable, a result of a command process, or response data.

An IC card of an embodiment includes a communication unit and a controller. The communication unit can communicate with one communication destination by a plurality of interfaces including a first interface and a second interface. The controller processes a command received by the communication unit, and makes the communication unit transmit a response to the command. In a case where the first interface becomes unavailable after the communication unit receives the command by the first interface until the communication unit transmits the response to the command, the controller makes the communication unit transmit a response containing discontinuation information indicating that the transmission of the response to the command received by the first interface is discontinued by the second interface.

According to this embodiment, in a case where the interface having received the command becomes unavailable for some reasons, it is possible to inform the outside that the interface becomes unavailable, the result of the command process, and the response data.

Hereinafter, an IC card, an IC module, and a portable terminal of embodiments will be described with reference to the drawings.

First Embodiment

Figure 1:
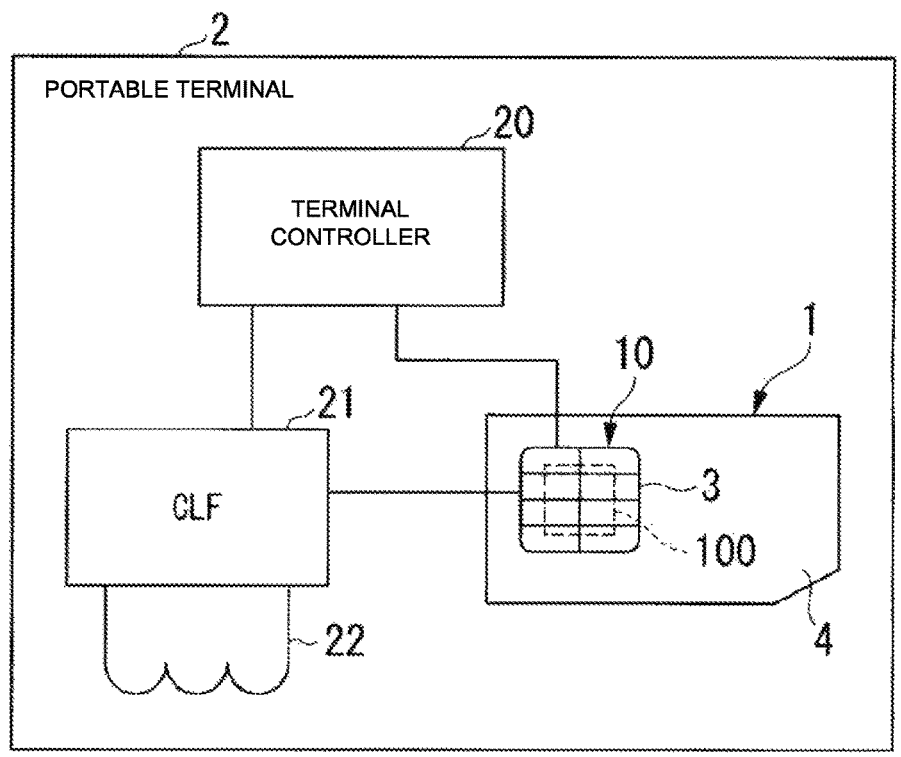
FIG. 1 is a block diagram illustrating an example of a portable terminal of a first embodiment.

FIG. 1 is a block diagram illustrating an example of a portable terminal 2 of a first embodiment.

As illustrated in FIG. 1, the portable terminal 2 includes a terminal controller 20 and a CLF (Contactless Front-End) 21. In addition, an IC card 1 is connected to the portable terminal 2 to be detachably attached thereto. Further, the IC card 1 and the portable terminal 2 form an IC card system.

The portable terminal 2 is, for example, a portable phone or a PDA (Personal Digital Assistant).

The terminal controller 20 is, for example, a processor containing a CPU (Central Processing Unit), and integrally controls the portable terminal 2. The terminal controller 20 communicates with the IC card 1 by an interface of a contact-type IC card defined in "ISO/IEC 7816" for example. In addition, the terminal controller 20 communicates with the IC card 1 through the CLF 21 by an interface of an SWP (Single Wire Protocol) communication defined in "ETSI TS 102 613" for example. The interface of the SWP communication defined in "ETSI TS 102 613" will be called an SWP I/F in the following description. In this way, the terminal controller 20 can communicate with the IC card 1 connected to the terminal controller 20 by two interfaces.

The terminal controller 20 transmits a command (a process request) to the IC card 1, and receives a response (a process response) as a result of a command process which is a process for the command.

The CLF 21 communicates with the IC card 1 by the SWP I/F. In addition, the CLF 21 communicates with an external apparatus of the portable terminal 2 by a contactless communication, for example, an NFC (Near Field Communication) or the like. For example, the CLF 21 converts the contactless communication with the external apparatus of the portable terminal 2 into a communication through the SWP I/F, and controls the communication between the IC card 1 and the outside (for example, the external apparatus) of the portable terminal 2.

Further, the communication between the terminal controller 20 and the IC card 1 through the SWP I/F may be performed, for example, through the CLF 21, or may be performed through an external apparatus using the SWP I/F and the contactless communication. In addition, in a case where the communication is performed using the SWP I/F and the contactless communication, the external apparatus and the terminal controller 20 may communicate, for example, using a 3G system (a third generation mobile communication system), a wireless LAN (Local Area Network), a USB (Universal Serial Bus), or the like.

A coil 22 is connected to the CLF 21, and serves as an antenna used in the contactless communication such as the NFC. The CLF 21 communicates with the external apparatus by the contactless communication such as the NFC through the coil 22.

The IC card 1 is, for example, a SIM (Subscriber Identity Module) card, and includes an IC module 10. The IC card 1 is formed, for example, by mounting the IC module 10 on a plastic card substrate 4 (an example of a card body). In other words, the IC card 1 includes the card substrate 4 and the IC module 10 embedded in the card substrate 4. In addition, the IC card 1 includes at least two interfaces of, for example, the interface (which may be referred to as a contact I/F in the following description) of the contact-type IC card defined in "ISO/IEC 7816" described above and the SWP I/F. In other words, the IC card 1 can communicate with the terminal controller 20 through a contact portion 3 by at least two interfaces of the contact I/F and the SWP I/F.

For example, the IC card 1 receives the command (the process request) transmitted by the terminal controller 20 of the portable terminal 2 through the contact portion 3, and performs the process (the command process) corresponding to the received command. Then, the IC card 1 transmits the response (the process response) obtained as a result of the command process to the portable terminal 2 through the contact portion 3.

The IC module 10 is sold in a type of COT (Chip On Tape) for example, and includes the contact portion 3 and an IC chip 100.

The contact portion 3 includes terminals of various types of signals necessary for the operation of the IC card 1. Details of the contact portion 3 will be described below with reference to FIG. 2.

The IC chip 100 is, for example, an LSI (Large Scale Integration) element such as a one-chip microprocessor.

Figure 2:
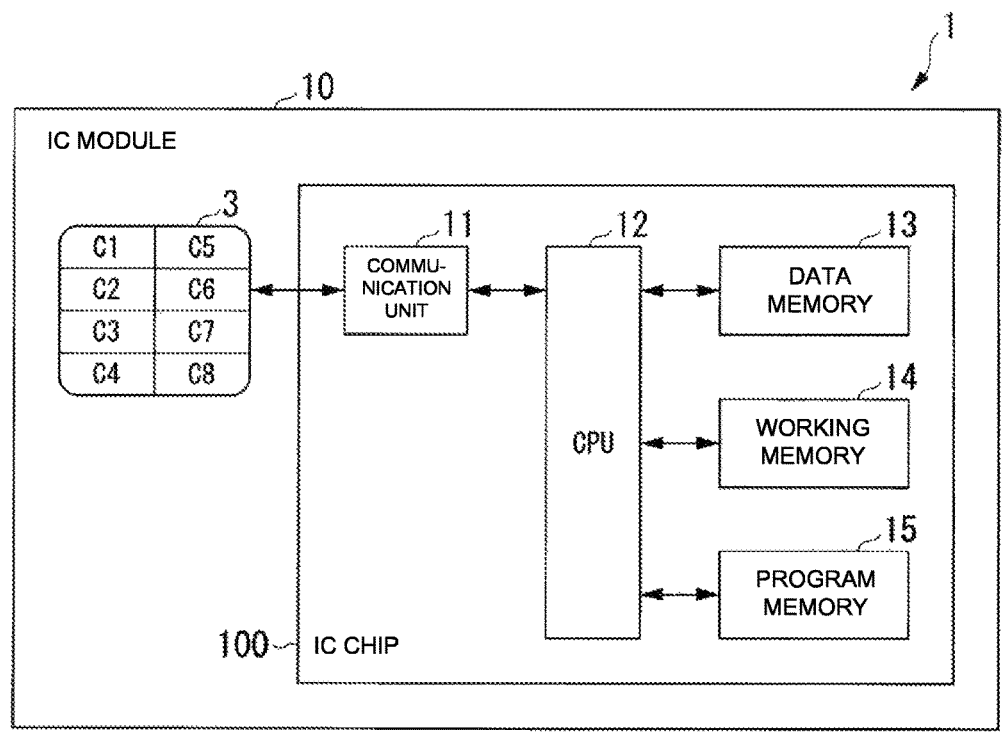
FIG. 2 is a block diagram illustrating an example of an IC card of the first embodiment.

FIG. 2 is a block diagram illustrating an example of the IC card 1 of this embodiment.

As illustrated in FIG. 2, the IC card 1 (the IC module 10) includes the contact portion 3 and the IC chip 100. Further, the IC chip 100 includes a communication unit 11, a CPU 12, a data memory 13, a working memory 14, and a program memory 15.

The contact portion 3 includes terminals C1 to C8. The terminal C1 is a VDD terminal to which a power source voltage VDD is supplied. The terminal C5 is a GND terminal to which a reference potential GND (ground) of the power source is supplied. The terminal C2 is an RST terminal to which a RST (reset) signal is supplied. The terminal C3 is a CLK terminal to which a CLK (clock) signal is supplied. The terminal C7 is a serial data input/output terminal (SIO terminal) for the contact I/F.

The terminal C6 is a serial data input/output terminal (SWIO terminal) for the SWP I/F. The terminal C4 is an input/output terminal (D+ terminal) of a D+ signal for a USB interface. The terminal C8 is an input/output terminal (D− terminal) of a D− signal for the USB interface.

In a case where the IC card 1 is mounted in the portable terminal 2, the RST terminal (the terminal C2), the CLK terminal (the terminal C3), and the SIO terminal (the terminal C7) are connected to, for example, an I/O (input/output) port (not illustrated) of the terminal controller 20, and used for the contact I/F. In addition, the SWIO terminal (the terminal C6) is connected to the CLF 21, and used for the SWP I/F. In addition, the RST terminal (the terminal C2), the CLK terminal (the terminal C3), the SIO terminal (the terminal C7), and the SWIO terminal (the terminal C6) are connected to the communication unit 11 of the IC chip 100.

The communication unit 11 can communicate with the same communication destination by the plurality of interfaces (for example, two of the contact I/F and the SWP I/F). Herein, the same communication destination is, for example, the terminal controller 20 of the portable terminal 2. The communication unit 11 receives a command from the terminal controller 20 by the contact I/F for example, and outputs the received command to the CPU 12. In addition, the communication unit 11 acquires a response to the subject command from the CPU 12, and transmits the response to the terminal controller 20 by the contact I/F.

In addition, the communication unit 11 receives a command from the terminal controller 20 by the SWP I/F for example, and outputs the received command to the CPU 12. In addition, the communication unit 11 acquires a response to the subject command from the CPU 12, and transmits the response to the terminal controller 20 by the SWP I/F.

The communication unit 11 monitors an SIO signal of the SIO terminal and an SWIO signal of the SWIO terminal for example, and determines whether the contact I/F and the SWP I/F enter an unavailable state. For example, the unavailable state of the contact I/F is a state where an SIO signal line is disconnected for some reasons, and does not enter an H (high) logical state. In a case where the contact I/F or the SWP I/F enters the unavailable state, the communication unit 11 outputs information indicating the situation to the CPU 12.

The data memory 13 is, for example, a rewritable nonvolatile memory unit such as an EEPROM, and stores data used in various processes of the IC card 1.

The working memory 14 is, for example, a volatile memory unit such as an SRAM (Static RAM), and temporarily stores data used for various processes of the IC card 1.

The program memory 15 is, for example, a nonvolatile memory unit such as a mask ROM, and stores a program for executing various processes of the IC card 1, and data such as a command table. Examples of the program for executing various processes include an operating system, an application program, and a program for executing various types of command processes.

The CPU 12 (an example of the controller) executes, for example, a program stored in the program memory 15 to perform various processes of the IC card 1. The CPU 12 processes the command received by the communication unit 11 and makes the communication unit 11 transmit a response to the subject command, for example. In addition, in a case where the communication unit 11 detects that the contact I/F or the SWP I/F enters the unavailable state, the CPU 12 makes the communication unit 11 transmit a response containing discontinuation information indicating that the transmission of a response to the command is discontinued, by an interface which is not unavailable.

In addition, for example, it is assumed that the contact I/F becomes unavailable after the communication unit 11 receives a command by the contact I/F until the communication unit 11 transmits a response to the subject command. In such a case, the CPU 12 makes the communication unit 11 transmit a response containing the discontinuation information indicating that the transmission of the response, by the contact I/F, to the subject command is discontinued, by the SWP I/F different from the contact I/F. Further, in a case where the contact I/F becomes unavailable, the CPU 12 stores the response to be transmitted (discontinuation response), for example, in a predetermined storage area of the working memory 14.

For example, in a case where the contact I/F becomes unavailable, and a case where an arbitrary command is received by the SWP I/F, the CPU 12 makes the communication unit 11 transmit a response containing the discontinuation information as a response to the subject command process by the SWP I/F. Herein, the discontinuation information is a special SW (status bytes (SW1 and SW2)) indicating that the transmission of the response is discontinued. Further, the arbitrary command is any one of the plurality of commands supported by the IC card 1 except a special command described below.

In addition, in a case where the arbitrary command received by the SWP I/F for example is normally ended in this case, the CPU 12 makes the communication unit 11 transmit a response containing the discontinuation information (the special SW) as a response to the subject command process. In addition, for example, in a case where the arbitrary command received by the SWP I/F is abnormally ended, the CPU 12 makes the communication unit 11 transmit an error response (a response containing the SW indicating an error) to the subject command process, and does not transmit the response containing the discontinuation information (the specific SW).

In addition, in a case where the communication unit 11 receives the specific command (a specific command) by the SWP I/F in such a state where the transmission of the response by the contact I/F is discontinued, the CPU 12 makes the communication unit 11 transmit a response containing the discontinued response by the SWP I/F. In other words, the CPU 12 makes the communication unit 11 transmit the response containing the discontinuation response stored in the predetermined storage area of the working memory 14 according to the special command by the SWP I/F. Herein, the special command is a command to request for transmitting the discontinued response.

Further, the CPU 12 keeps on performing the process of transmitting the response containing the special SW to the above-mentioned arbitrary command until the special command is executed. In other words, the CPU 12 stops transmitting the response containing the special SW by the SWP I/F after the special command is executed.

In addition, for example, the CPU 12 executes the same process as the above-mentioned process after the communication unit 11 receives the command by the SWP I/F until the communication unit 11 transmits the response to the subject command even in a case where the SWP I/F becomes unavailable. In other words, the CPU 12 makes the communication unit 11 transmit a response containing the discontinuation information (for example, the special SW) indicating that the transmission of the response to the subject command by the SWP I/F is discontinued by the contact I/F different from the SWP I/F. Further, in a case where the SWP I/F becomes unavailable, the CPU 12 stores the response to be transmitted (the discontinuation response), for example, in a predetermined storage area of the working memory 14.

For example, in a case where the SWP I/F becomes unavailable and the arbitrary command is received by the contact I/F as described above, the CPU 12 makes the communication unit 11 transmit the response containing the special SW by the contact I/F as a response to the subject command process.

In addition, for example, in a case where the arbitrary command received by the contact I/F is normally ended in this case, the CPU 12 makes the communication unit 11 transmit the response containing the special SW as the response to the command process. In addition, for example, in a case where the arbitrary command received by the contact I/F is abnormally ended, the CPU 12 makes the communication unit 11 transmit the error response (the response containing the SW indicating an error) to the command process, and makes the communication unit 11 not transmit the response containing the special SW.

In addition, in a case where the communication unit 11 receives the special command (a specific command) by the contact I/F in such a state where the transmission of the response by the SWP I/F is discontinued, the CPU 12 makes the communication unit 11 transmit the response containing the discontinued response by the contact I/F. In other words, the CPU 12 makes the communication unit 11 transmit the response containing the discontinuation response stored in the predetermined storage area of the working memory 14 according to the special command by the contact I/F. Further, the CPU 12 keeps on performing the process of transmitting the response containing the specific SW to the above-mentioned arbitrary command until the specific command is executed. In other words, the CPU 12 stops transmitting the response containing the specific SW by the contact I/F after the specific command is executed.

Next, the operation of the IC card 1 (the IC module 10) according to this embodiment will be described with reference to the drawings.

Figure 3:
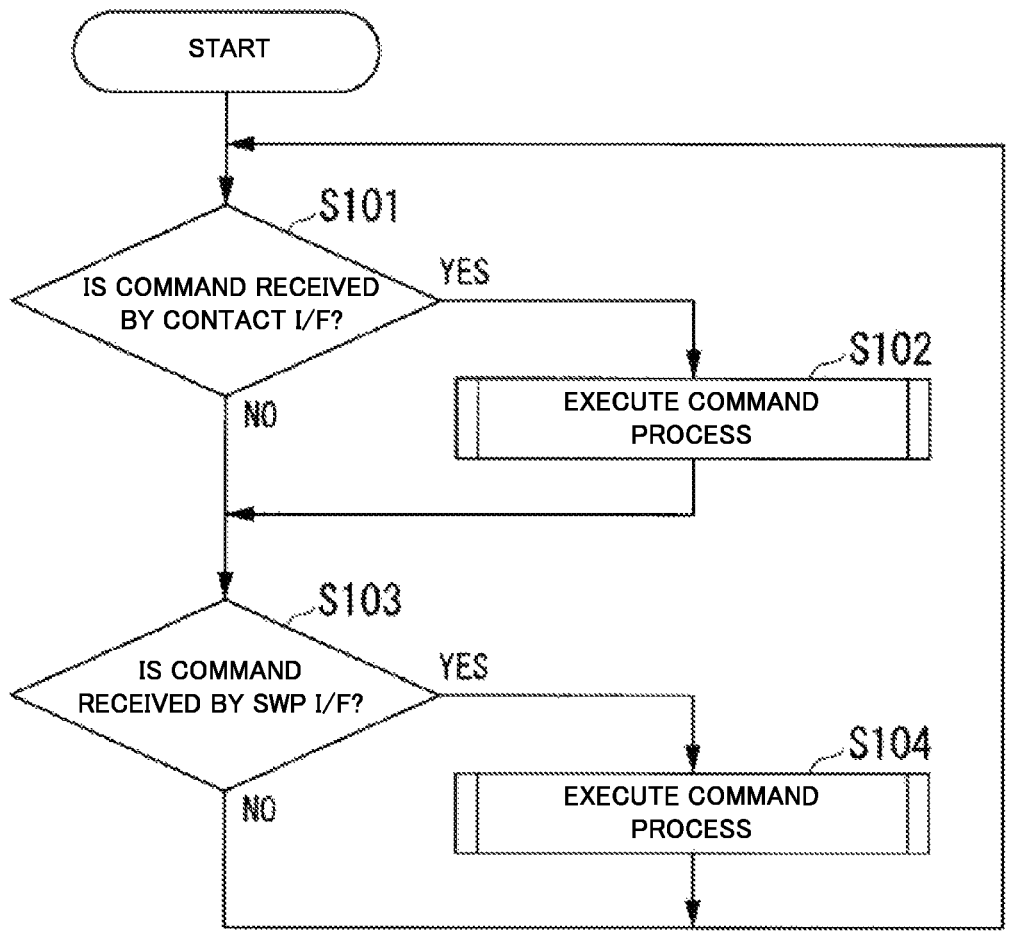
FIG. 3 is a flowchart illustrating an example of an operation of the IC card of the first embodiment.

FIG. 3 is a flowchart illustrating an example of the operation of the IC card 1.

In FIG. 3, the IC card 1 first determines whether a command is received by the contact I/F (Step S101). In other words, the CPU 12 of the IC card 1 determines whether the communication unit 11 receives a command by the contact I/F. In a case where the communication unit 11 receives a command by the contact I/F (Step S101: YES), the CPU 12 progresses the process to Step S102. In addition, in a case where the communication unit 11 does not receive a command by the contact I/F (Step S101: NO), the CPU 12 progresses the process to Step S103.

In Step S102, the CPU 12 executes the command process corresponding to the command received by the contact I/F. Further, details of the command process corresponding to the command received by the contact I/F will be described below with reference to FIG. 4. After the process of Step S102, the CPU 12 progresses the process to Step S103.

In addition, in Step S103, the CPU 12 determines whether a command is received by the SWP I/F. In other words, the CPU 12 of the IC card 1 determines whether the communication unit 11 receives a command by the SWP I/F. In a case where the communication unit 11 receives a command by the SWP I/F (Step S103: YES), the CPU 12 progresses the process to Step S104. In addition, in a case where the communication unit 11 does not receive a command by the SWP I/F (Step S103: NO), the CPU 12 returns the process to Step S101.

In Step S104, the CPU 12 executes the command process corresponding to the command received by the SWP I/F. Further, details of the command process corresponding to the command received by the SWP I/F will be described below with reference to FIG. 5. After the process of Step S104, the CPU 12 returns the process to Step S101.

Next, the command process corresponding to the command received by the contact I/F of Step S102 described above will be described with reference to FIG. 4.

Figure 4:
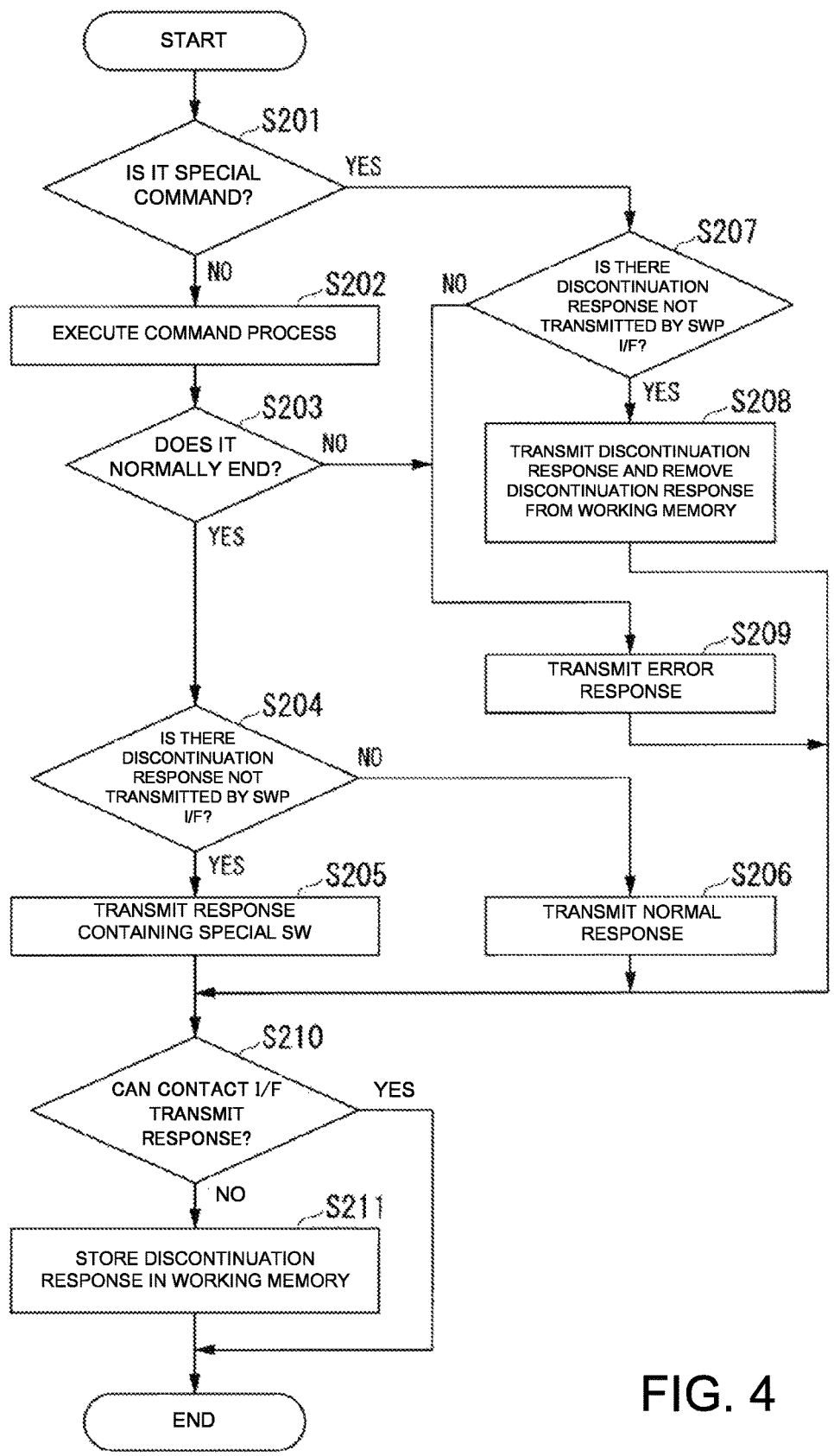
FIG. 4 is a flowchart illustrating an example of a command process of a contact I/F of the first embodiment.

FIG. 4 is a flowchart illustrating an example of the command process corresponding to the command received by the contact I/F of this embodiment.

In FIG. 4, first, the CPU 12 determines whether the received command is a special command (Step S201). In a case where the received command is a special command (Step S201: YES), the CPU 12 progresses the process to Step S207. In addition, in a case where the received command is not a special command (Step S201: NO), the CPU 12 progresses the process to Step S202.

In Step S202, the CPU 12 executes the command process. In other words, the CPU 12 executes the command process corresponding to the command received by the communication unit 11.

Next, the CPU 12 determines whether the executed command process is normally ended (Step S203). In a case where the executed command process is normally ended (Step S203: YES), the CPU 12 progresses the process to Step S204. In addition, in a case where the executed command process is not normally ended (Step S203: NO), the CPU 12 progresses the process to Step S209.

In Step S204, the CPU 12 determines whether there is a discontinuation response which has not been transmittable by the SWP I/F. The CPU 12 determines, for example, whether the discontinuation response is stored in a predetermined storage area of the working memory 14 so as to determine whether there is the discontinuation response by the SWP I/F. In a case where there is the discontinuation response by the SWP I/F (Step S204: YES), the CPU 12 progresses the process to Step S205. In addition, in a case where there is no discontinuation response by the SWP I/F (Step S204: NO), the CPU 12 progresses the process to Step S206.

In Step S205, the CPU 12 makes the communication unit 11 transmit the response containing the special SW. In other words, the CPU 12 replaces the normal SW indicating the normal ending among the responses to the command received by the contact I/F with the special SW, and makes the communication unit 11 transmit the response containing the special SW by the contact I/F. After the process of Step S205, the CPU 12 progresses the process to Step S210.

In addition, in Step S206, the CPU 12 makes the communication unit 11 transmit the normal response. In other words, the CPU 12 makes the communication unit 11 transmit the normal response (the response containing the normal SW) by the contact I/F, which indicates a normal ending response to the command received by the contact I/F. After the process of Step S206, the CPU 12 progresses the process to Step S210.

In addition, in Step S207, the CPU 12 determines whether there is the discontinuation response by the SWP I/F. For example, the CPU 12 determines whether the discontinuation response is stored in the predetermined storage area of the working memory 14 so as to determine whether there is the discontinuation response by the SWP I/F. In a case where there is the discontinuation response by the SWP I/F (Step S207: YES), the CPU 12 progresses the process to Step S208. In addition, in a case where there is no discontinuation response by the SWP I/F (Step S207: NO), the CPU 12 progresses the process to Step S209.

In Step S208, the CPU 12 makes the communication unit 11 transmit the discontinuation response. In other words, the CPU 12 makes the communication unit 11 transmit a response containing the discontinuation response by the contact I/F with respect to the special command received by the contact I/F, and removes discontinuation response information from the working memory 14. The CPU 12 clears, for example, the discontinuation response information stored in the predetermined storage area of the working memory 14. After the process of Step S208, the CPU 12 progresses the process to Step S210.

In addition, in Step S209, the CPU 12 makes the communication unit 11 transmit the error response. In other words, the CPU 12 makes the communication unit 11 transmit the error response (the response containing the SW indicating an abnormal ending) by the contact I/F, which indicates an abnormal ending response to the command received by the contact I/F. After the process of Step S209, the CPU 12 progresses the process to Step S210.

In Step S210, the CPU 12 determines whether transmission of a response by the contact I/F can be available. In other words, the CPU 12 determines whether the communication unit 11 detects that the contact I/F is unavailable. In a case where the transmission of the response by the contact I/F is unavailable (Step S210: NO), the CPU 12 determines that the transmission of the response is discontinued, and progresses the process to Step S211. In addition, in a case where the transmission of the response by the contact I/F is available (Step S210: YES), the CPU 12 determines that the transmission of the response is normally ended, and ends the command process corresponding to the command received by the contact I/F.

In Step S211, the CPU 12 stores the discontinuation response in the working memory 14. In other words, the CPU 12 stores the discontinuation response in a predetermined storage area of the working memory 14, and ends the command process corresponding to the command received by the contact I/F.

Next, the command process corresponding to the command received by the SWP I/F of Step S104 described above will be described with reference to FIG. 5.

Figure 5:
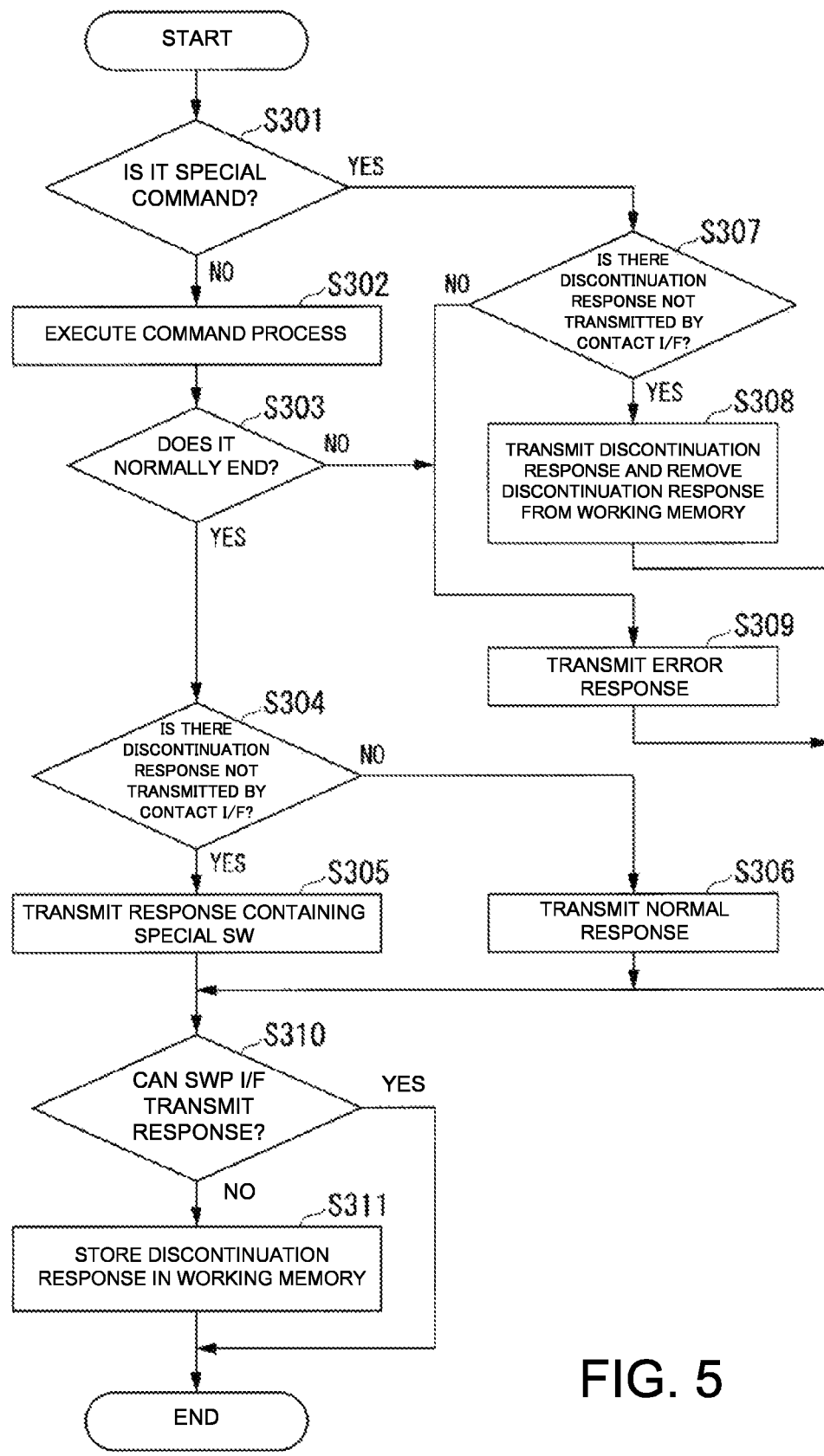
FIG. 5 is a flowchart illustrating an example of a command process of an SWP I/F of the first embodiment.

FIG. 5 is a flowchart illustrating an example of the command process corresponding to the command received by the SWP I/F of this embodiment.

The command processes corresponding to the command received by the SWP I/F in Steps S301 to S311 illustrated in FIG. 5 are basically similar to the processes in Steps S201 to S211 illustrated in FIG. 4 except that the SWP I/F is used instead of the contact I/F.

Further, in FIG. 5, the processes of Steps S304 and S307 are replaced with the process of determining whether there is the discontinuation response which has not been transmittable by the contact I/F. In addition, the process of Step S310 is replaced with the process of determining whether the response by the SWP I/F can be transmitted. In the other processes, the CPU 12 executes the processes as the processes of the SWP I/F.

Next, an example of the operation of the IC card 1 of this embodiment will be described with reference to FIGS. 6 and 7.

Figure 6:
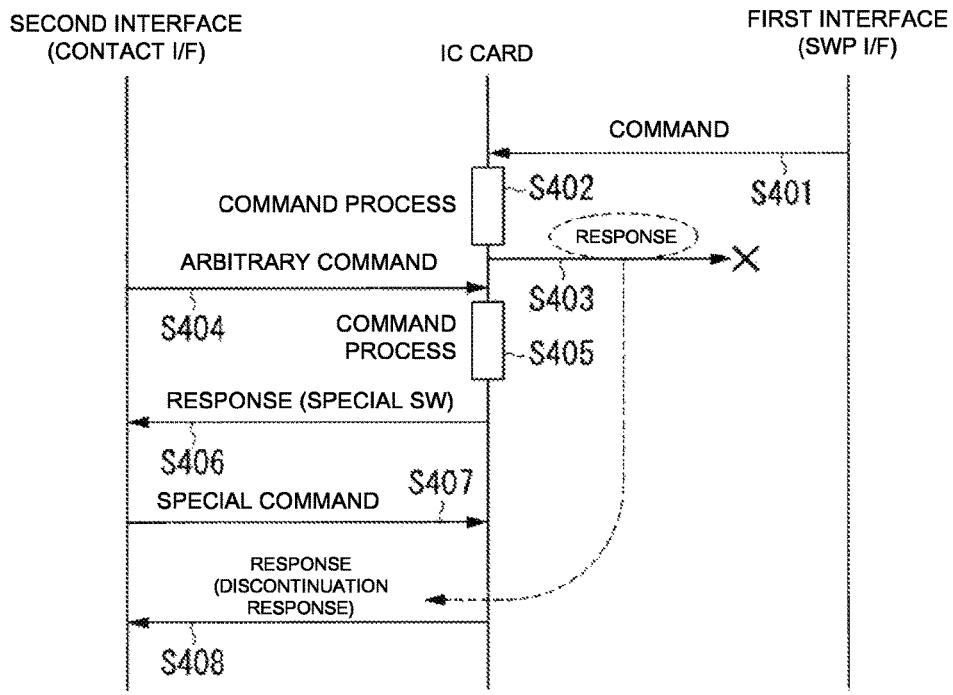
FIG. 6 is a sequence diagram illustrating an example of an operation of the IC card of the first embodiment.

FIG. 6 is a sequence diagram illustrating an example of the operation of the IC card 1 of this embodiment.

Further, in these drawings, the first interface of each of the IC card 1 and the portable terminal 2 is assumed as the SWP I/F. The second interface is assumed as the contact I/F.

In FIG. 6, first, the terminal controller 20 of the portable terminal 2 transmits a command to the IC card 1 by the SWP I/F of the portable terminal 2 (Step S401).

According to the command, the IC card 1 executes the command process (Step S402). In other words, the CPU 12 executes the command process corresponding to the command received by the SWP I/F of the IC card 1.

In addition, the IC card 1 transmits the response obtained as a result of the command process by the SWP I/F of the IC card 1 (Step S403). In this case, it is assumed herein that the SWP I/F of the IC card 1 becomes unavailable for some reasons. Therefore, the CPU 12 records the discontinuation response in a predetermined storage area of the working memory 14, indicating a response which has not been transmittable.

Next, the terminal controller 20 of the portable terminal 2 transmits the arbitrary command to the IC card 1 by the contact I/F of the portable terminal 2 (Step S404).

According to the command, the IC card 1 executes the command process (Step S405). In other words, the CPU 12 executes the command process corresponding to the command received by the contact I/F of the IC card 1.

In addition, the IC card 1 includes the special SW in a response obtained as a result of the command process, and transmits the response by the contact I/F of the IC card 1 (Step S406). Therefore, the terminal controller 20 detects that the SWP I/F of the IC card 1 is unavailable.

Next, the terminal controller 20 transmits the special command to the IC card 1 by the contact I/F of the portable terminal 2 (Step S407).

According to the special command, the IC card 1 transmits the response containing the discontinuation response (Step S408). In other words, the CPU 12 reads the discontinuation response from the predetermined storage area of the working memory 14, and generates a response containing the discontinuation response. The CPU 12 makes the communication unit 11 transmit the response containing the discontinuation response by the contact I/F of the IC card 1.

Therefore, the terminal controller 20 can acquire the discontinuation response obtained as a result of the command process which has been discontinued due to the unavailability of the SWP I/F of the IC card 1.

Figure 7:
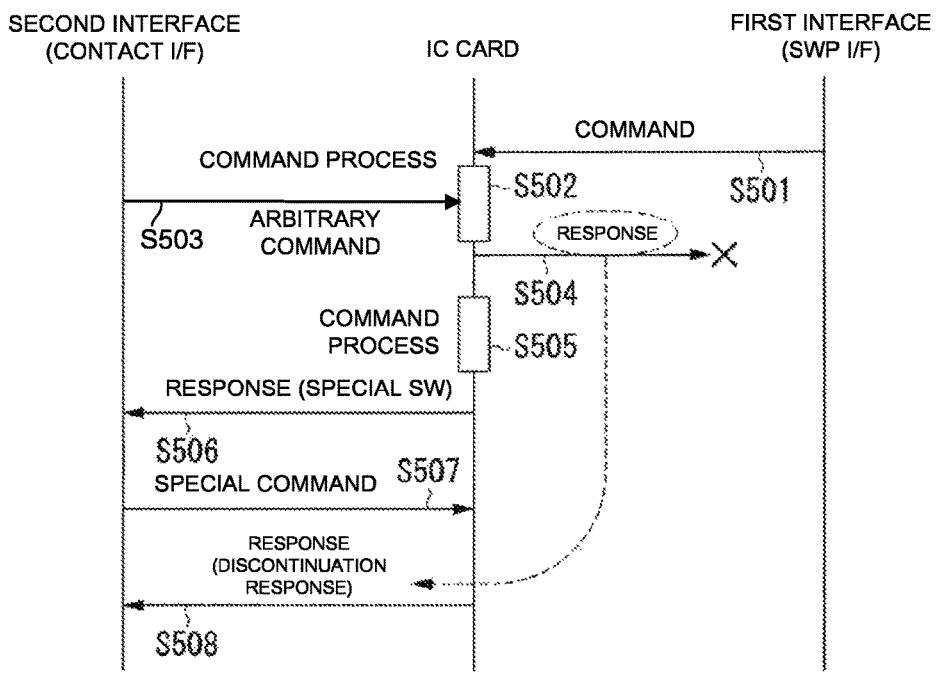
FIG. 7 is a sequence diagram illustrating another example of an operation of the IC card of the first embodiment.

In addition, FIG. 7 is a sequence diagram illustrating another example of the operation of the IC card 1 of this embodiment. FIG. 7 illustrates an example in which the IC card 1 receives an arbitrary command by the contact I/F of the IC card 1 during the period when the IC card 1 executes the command process corresponding to the command received by the SWP I/F of the IC card 1.

Further, in the drawing, similarly to FIG. 6, the first interface of each of the IC card 1 and the portable terminal 2 is assumed as the SWP I/F. The second interface is assumed as the contact I/F.

In FIG. 7, first, the terminal controller 20 of the portable terminal 2 transmits a command to the IC card 1 by the SWP I/F of the portable terminal 2 (Step S501).

According to the command, the IC card 1 executes the command process (Step S502). In other words, the CPU 12 executes the command process corresponding to the command received by the SWP I/F of the IC card 1.

In addition, during the command process, the terminal controller 20 of the portable terminal 2 transmits the arbitrary command to the IC card 1 by the contact I/F of the portable terminal 2 (Step S503).

Next, the IC card 1 transmits, by the SWP I/F of the IC card 1, a response obtained as a result of the command process corresponding to the command received by the SWP I/F of the IC card 1 (Step S504). In this case, the SWP I/F of the IC card 1 is assumed herein to become unavailable for some reasons. Therefore, the CPU 12 stores the discontinuation response which has not been transmittable in a predetermined storage area of the working memory 14.

Next, the IC card 1 executes the command process according to the arbitrary command received by the contact I/F of the IC card 1 (Step S505). In other words, the CPU 12 executes the command process corresponding to the command received by the contact I/F of the IC card 1.

Next, the IC card 1 includes the special SW in a response obtained as a result of the command process, and transmits the response containing the special SW by the contact I/F of the IC card 1 (Step S506). Therefore, the terminal controller 20 detects that the SWP I/F of the IC card 1 is unavailable.

Next, the terminal controller 20 transmits the special command to the IC card 1 by the contact I/F of the portable terminal 2 (Step S507).

According to the special command, the IC card 1 transmits the response containing the discontinuation response (Step S508). In other words, the CPU 12 reads the discontinuation response from the predetermined storage area of the working memory 14, and generates a response containing the discontinuation response. The CPU 12 makes the communication unit 11 transmit the response containing the discontinuation response by the contact I/F of the IC card 1.

Therefore, the terminal controller 20 can acquire the discontinuation response obtained as a result of the command process which has been discontinued due to the unavailability of the SWP I/F of the IC card 1.

The case where the SWP I/F of the IC card 1 becomes unavailable was described with reference to the examples illustrated in FIGS. 6 and 7. However, the operation in the case where the contact I/F of the IC card 1 becomes unavailable is the same as those illustrated in FIGS. 6 and 7 except that the SWP I/F is replaced with the contact I/F. In addition, in this case, the first interface is assumed as the contact I/F. The second interface is assumed as the SWP I/F.

As described above, the IC card 1 according to this embodiment includes the communication unit 11 and the CPU 12 (the controller). The communication unit 11 can communicate with the same communication destination (for example, the portable terminal 2 (the terminal controller 20)) by the plurality of interfaces (for example, the contact I/F and the SWP I/F). The CPU 12 processes the command received by the communication unit 11, and makes the communication unit 11 transmit a response to the command. In addition, the CPU 12 makes the communication unit 11 transmit a response containing the discontinuation information (for example, the special SW) by the second interface (for example, the contact I/F) in a case where the first interface becomes unavailable after the communication unit 11 receives the command by the first interface (for example, the SWP I/F) which is one of the plurality of interfaces until the communication unit transmits a response to the subject command. Herein, the second interface is an interface different from the first interface among the plurality of interfaces. In addition, the discontinuation information indicates that the transmission of the response to the subject command by the first interface is discontinued.

With this configuration, the communication destination (for example, the portable terminal 2 (the terminal controller 20)) of the IC card 1 can detect that the first interface of the IC card 1 becomes unavailable by the response transmitted by the second interface of the IC card 1. Therefore, the IC card 1 according to this embodiment can perform various processes, for example, the transmission of the special command by the second interface. Accordingly, the IC card 1 according to this embodiment can improve convenience.

In addition, in this embodiment, in a case where the first interface (for example, the SWP I/F) becomes unavailable and the arbitrary command is received by the second interface (for example, the contact I/F), the CPU 12 makes the communication unit 11 transmit the response containing the discontinuation information (for example, the special SW) by the second interface as a response to the subject command process. Further, herein, the description "the first interface (for example, the SWP I/F) becomes unavailable" indicates a case where the first interface becomes unavailable after the command is received by the first interface until the response to the subject command is transmitted.

Therefore, the communication destination (for example, the portable terminal 2 (the terminal controller 20)) of the IC card 1 can detect that the first interface of the IC card 1 becomes unavailable by transmitting the arbitrary command toward the second interface of the IC card 1.

In addition, in a case where the first interface of the IC card 1 is released from its unavailability, the IC card 1 according to this embodiment stops the transmission of the response containing the discontinuation information (for example, the special SW). Therefore, the portable terminal 2 (the terminal controller 20) can detect that the first interface becomes unavailable by transmitting the arbitrary command toward the second interface of the IC card 1.

In addition, in this embodiment, in a case where the arbitrary command is normally ended, the CPU 12 makes the communication unit 11 transmit the response containing the discontinuation information (for example, the special SW) as a response to the subject command process.

Therefore, in a case where the arbitrary command is normally ended, the IC card 1 according to this embodiment can inform the discontinuation of the transmission of the response to the subject command by the first interface of the IC card 1 to the portable terminal 2 (the terminal controller 20) by the second interface of the IC card 1. In addition, in a case where the arbitrary command is abnormally ended, the CPU 12 makes the communication unit 11 transmit the response containing the SW indicating the content of the abnormal ending. In other words, in a case where the arbitrary command is abnormally ended, the IC card 1 according to this embodiment can appropriately inform the content of the abnormal ending to the portable terminal 2 (the terminal controller 20).

In addition, in this embodiment, in a case where the communication unit 11 receives a specific command (for example, the special command) to request for transmitting the discontinued response by the second interface of the IC card 1, the CPU 12 makes the communication unit 11 transmit the discontinued response by the second interface of the IC card 1.

Therefore, the portable terminal 2 (the terminal controller 20) can acquire the discontinuation response transmitted from the second interface of the IC card 1. Accordingly, the IC card 1 according to this embodiment can more improve the convenience. In addition, in a case where the first interface of the IC card 1 becomes unavailable, the CPU 12 uses the second interface of the IC card 1 to transmit the response to the command received by the first interface, so that the IC card 1 according to this embodiment can improve the reliability of data communication.

In addition, in this embodiment, the CPU 12 stops the transmission of the response containing the discontinuation information (for example, the special SW) by the second interface of the IC card 1 after a specific command (for example, the special command) is executed.

Therefore, the IC card 1 according to this embodiment can prevent a response containing the discontinuation information (for example, the special SW) from being continued to be unnecessarily transmitted.

In addition, the IC module 10 according to this embodiment includes the communication unit 11 and the CPU 12 (the controller). The communication unit 11 can communicate with the same communication destination (for example, the portable terminal 2 (the terminal controller 20)) by the plurality of interfaces (for example, the contact I/F and the SWP I/F). The CPU 12 processes the command received by the communication unit 11, and makes the communication unit 11 transmit the response to the subject command. In addition, the CPU 12 makes the communication unit 11 transmit a response containing the discontinuation information (for example, the special SW) by the second interface (for example, the contact I/F) in a case where the first interface becomes unavailable after the communication unit 11 receives the command by the first interface (for example, the SWP I/F) which is one of the plurality of interfaces until the communication unit transmits a response to the subject command.

Therefore, the IC module 10 according to this embodiment can improve the convenience similarly to the IC card 1.

In addition, the portable terminal 2 according to this embodiment includes the terminal controller 20 that communicates with the above-mentioned IC card 1 by the plurality of interfaces. In other words, the portable terminal 2 includes the contact I/F corresponding to the contact I/F of the IC module 10 and the SWP I/F corresponding to the SWP I/F of the IC module 10.

The portable terminal 2 according to this embodiment can improve the convenience similarly to the IC card 1 and the IC module 100.

Second Embodiment

Next, the IC module 10 and the IC card 1 according to a second embodiment will be described with reference to the drawings.

In this embodiment, the description will be made about an example in which the IC card 1 does not transmit the response containing the special SW but transmits the discontinuation response by the special command.

Further, the configurations of the IC card 1 and the portable terminal 2 according to this embodiment are the same as those of the first embodiment illustrated in FIGS. 1 and 2, and the description thereof will not be repeated.

In addition, the operation of the IC card 1 according to this embodiment is the same as those illustrated in FIGS. 3, 4, and 5 except the following point.

In the IC card 1 according to this embodiment, the CPU 12 executes the process of Step S206 without performing the processes of Steps S204 and S205 illustrated in FIG. 4. In addition, in the IC card 1 according to this embodiment, the CPU 12 executes the process of Step S306 without performing the processes of Steps S304 and S305 illustrated in FIG. 5.

In other words, in this embodiment, in a case where the first interface becomes unavailable with respect to the arbitrary command, the CPU 12 does not perform the process in which the communication unit 11 transmits the response containing the special SW by the second interface.

Next, an example of the operation of the IC card 1 of this embodiment will be described with reference to FIG. 8.

Figure 8:
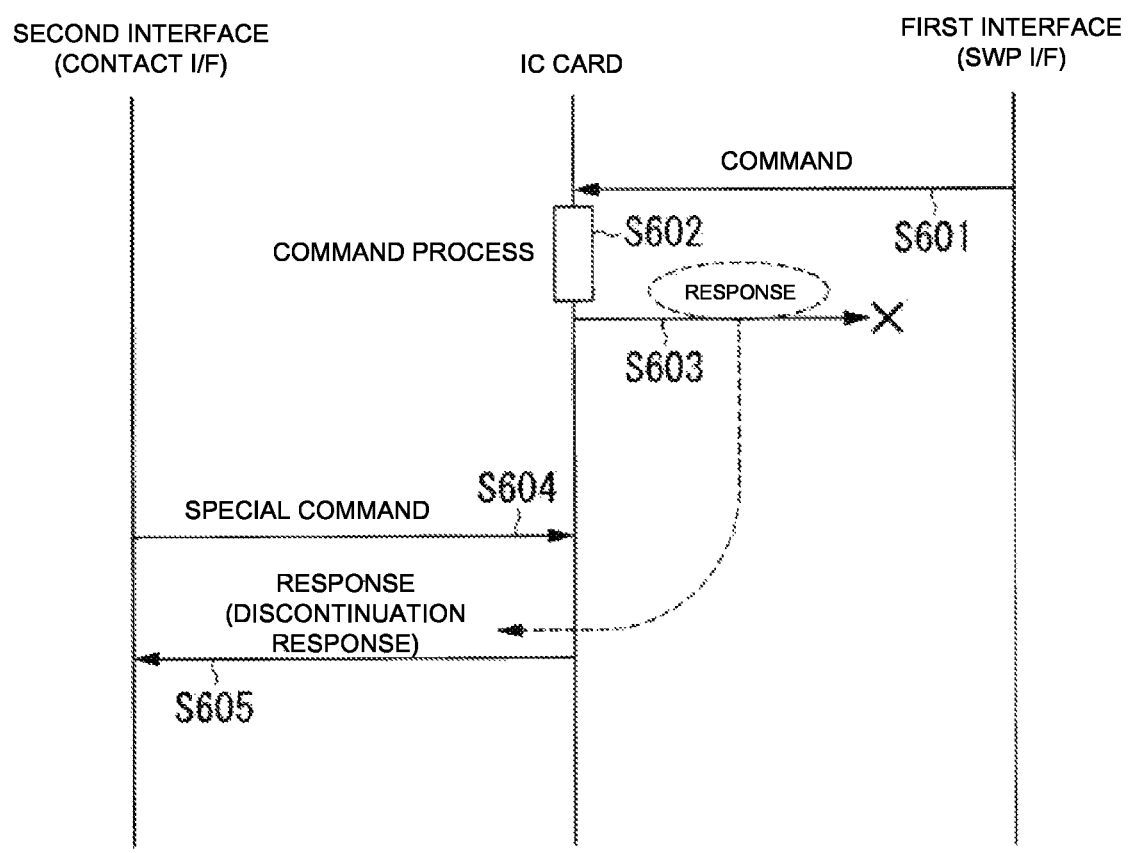
FIG. 8 is a sequence diagram illustrating an example of an operation of an IC card of a second embodiment.

FIG. 8 is a sequence diagram illustrating an example of the operation of the IC card 1 of this embodiment.

In FIG. 8, the first interface of each of the IC card 1 and the portable terminal 2 is assumed as the SWP I/F. The second interface is assumed as the contact I/F.

In FIG. 8, first, the terminal controller 20 of the portable terminal 2 transmits a command to the IC card 1 by the SWP I/F of the portable terminal 2 (Step S601).

According to the command, the IC card 1 executes the command process (Step S602). In other words, the CPU 12 executes the command process corresponding to the command received by the SWP I/F of the C card 1.

In addition, the IC card 1 transmits a response obtained as a result of the command process by the SWP I/F of the IC card 1 (Step S603). In this case, it is assumed herein that the SWP I/F of the IC card 1 becomes unavailable for some reasons. Therefore, the CPU 12 stores the discontinuation response which has not been transmittable, in a predetermined storage area of the working memory 14.

Herein, since the response from the IC card 1 is not receivable by the SWP I/F of the portable terminal 2, the terminal controller 20 determines that there is a possibility that the SWP I/F of the IC card 1 becomes unavailable for some reasons. Then, the terminal controller 20 transmits the special command by the contact I/F of the portable terminal 2 to the IC card 1 (Step S604).

According to the special command, the IC card 1 transmits the response containing the discontinuation response (Step S605). In other words, the CPU 12 reads the discontinuation response from the predetermined storage area of the working memory 14, and generates the response containing the discontinuation response. The CPU 12 makes the communication unit 11 transmit the response containing the discontinuation response by the contact I/F of the IC card 1.

Therefore, the terminal controller 20 can acquire the discontinuation response obtained as a result of the command process which has been discontinued due to the unavailability of the SWP I/F of the IC card 1.

Further, in the example illustrated in FIG. 8 above, the description has been made about the case where the SWP I/F of the IC card 1 becomes unavailable. The operation in the case where the contact I/F of the IC card 1 becomes unavailable is the same as that illustrated in FIG. 8 except that the SWP I/F is changed into the contact I/F. In addition, in this case, the first interface is assumed as the contact I/F. The second interface is assumed as the SWP I/F.

As described above, the IC card 1 and the IC module 10 according to this embodiment include the communication unit 11 and the CPU 12 (the controller). The communication unit 11 can communicate with the same communication destination (for example, the portable terminal 2 (the terminal controller 20)) by the plurality of interfaces (for example, the contact I/F and the SWP I/F). The CPU 12 processes the command received by the communication unit 11, and makes the communication unit 11 transmit a response to the command. In addition, the CPU 12 makes the communication unit 11 transmit the response containing the response discontinued by the second interface (for example, the contact I/F) in a state where the communication unit 11 corresponds to the following case. In other words, the above-mentioned case is a case where the first interface becomes unavailable and the communication unit 11 is receives a specific command by the second interface after the communication unit 11 receives a command by the first interface until a response to the subject command is transmitted. In addition, the specific command is a command (for example, the special command) to require that the discontinuation response to the command received by the first interface be transmitted.

Therefore, the portable terminal 2 (the terminal controller 20) can acquire the discontinuation response by the second interface. Accordingly, the IC card 1 and the IC module 10 according to this embodiment can improve the convenience. In addition, in a case where the first interface becomes unavailable, the IC card 1 and the IC module 10 according to this embodiment transmit, by the second interface, the response to the command received by the first interface, so that the reliability of the data communication can be improved.

In the above embodiments, the contact I/F and the SWP I/F included in the IC card and the IC module have been exemplified as an interface. However, the interface is not limited to the above components. The above embodiments may employ, for example, the USB interface (the terminal C4 and the terminal C8) as the interface other than the contact I/F and the SWP I/F, or may employ other interfaces.

In addition, the above embodiments may be applied to three or more interfaces.

In addition, the above embodiments have been described about an example in which the data memory 13 is an EEPROM as a rewritable nonvolatile memory unit. However, the data memory 13 is not limited to the above component. For example, the data memory 13 may be a flash EEPROM, a FeRAM (Ferroelectric Random Access Memory) or the like instead of the EEPROM.

In addition, the above embodiments have been described about an example in which the IC card 1 communicates with the portable terminal 2 through the contact portion 3. However, at least one of the interfaces may be a contactless interface which uses a coil or the like.

In addition, the above embodiments have been described about an example in which the IC card 1 communicates with the portable terminal 2. However, the above embodiments may be applied to an example in which the IC card 1 communicates with a terminal apparatus having a stationary reader/writer.

In addition, the above embodiments have been described about an example in which the IC card 1 is a SIM card. However, the IC card 1 may be, for example, an IC cash card or a credit card, or may be other types of cards.

In addition, the above embodiments have been described about an example in which the CPU 12 makes the communication unit 11 transmit the response containing the discontinuation response with respect to the special command, but the communication unit 11 may transmit the discontinuation response without any change.

In addition, the first embodiment has been described about an example in which the IC card 1 transmits the response containing the discontinuation information as a response containing the special SW, but the invention is not limited thereto. For example, the IC card 1 may include the discontinuation information in an ATR (Answer to Reset) and transmit the ATR.

In addition, the first embodiment has been described about an example in which the CPU 12 makes the communication unit 11 transmit the response containing the discontinuation response with respect to the special command, but the process for the special command may be not included.

According to at least one of the above embodiments, the IC card 1 or the IC module 100 includes the communication unit 11 which can communicate with the same communication destination by the plurality of interfaces (for example, the contact I/F and the SWP I/F), and the CPU 12 which makes the communication unit 11 perform a predetermined communication by the second interface (for example, the contact I/F) in a case where the first interface becomes unavailable after the communication unit 11 receives a command by the first interface (for example, the SWP I/F)

until when a response to the command is received. Therefore, it is possible to improve the convenience.

Third Embodiment

Examples of a manner of the communication between the IC card and an external terminal include a contact manner and a contactless manner. The IC card provided with both of a contact interface and a contactless interface is called a combination card. Since a communication manner is transferred from the contact manner to the contactless manner, the contact manner and the contactless manner are mixed.

When the combination card is inserted into a slot for contact communication of the terminal provided with both of the contact interface and the contactless interface, the terminal performs an activation process of the contact manner by priority on the combination card. The combination card does not have a function of giving a command to switch the contact manner and the contactless manner to the terminal. Therefore, even though a contactless manner communication is performed speedily more than the contact manner communication, the terminal may be unable to take advantage of the communication between the terminal and the combination card.

Even though the plurality of interfaces is provided, the conventional IC card does not effectively use the plurality of interfaces. For example, the conventional IC card and the terminal is unable to take advantage of the speedy communication.

According to this embodiment, the invention can provide a portable electronic apparatus, an IC module, and a terminal which can take advantage of the contactless manner communication.

The portable electronic apparatus of this embodiment includes a main body in which an antenna is formed, and an IC module which is embedded in the main body and includes a contact portion. The IC module includes a contact communication unit, a contactless communication unit, and a controller. The contact communication unit communicates with the terminal in the contact manner using the contact portion. The contactless communication unit communicates with the terminal using the antenna in the contactless manner by a magnetic field generated from the terminal. In a case where the contactless communication unit receives the magnetic field when the contact communication unit communicates with the terminal in the contact manner, the controller transmits information on the contactless manner communication by the contactless communication unit to the terminal by the contact communication unit.

According to the portable electronic apparatus, it is possible to communicate with the terminal at high speed.

Hereinafter, the portable electronic apparatus, the IC module, and the terminal of this embodiment will be described with reference to the drawings.

Figure 9:
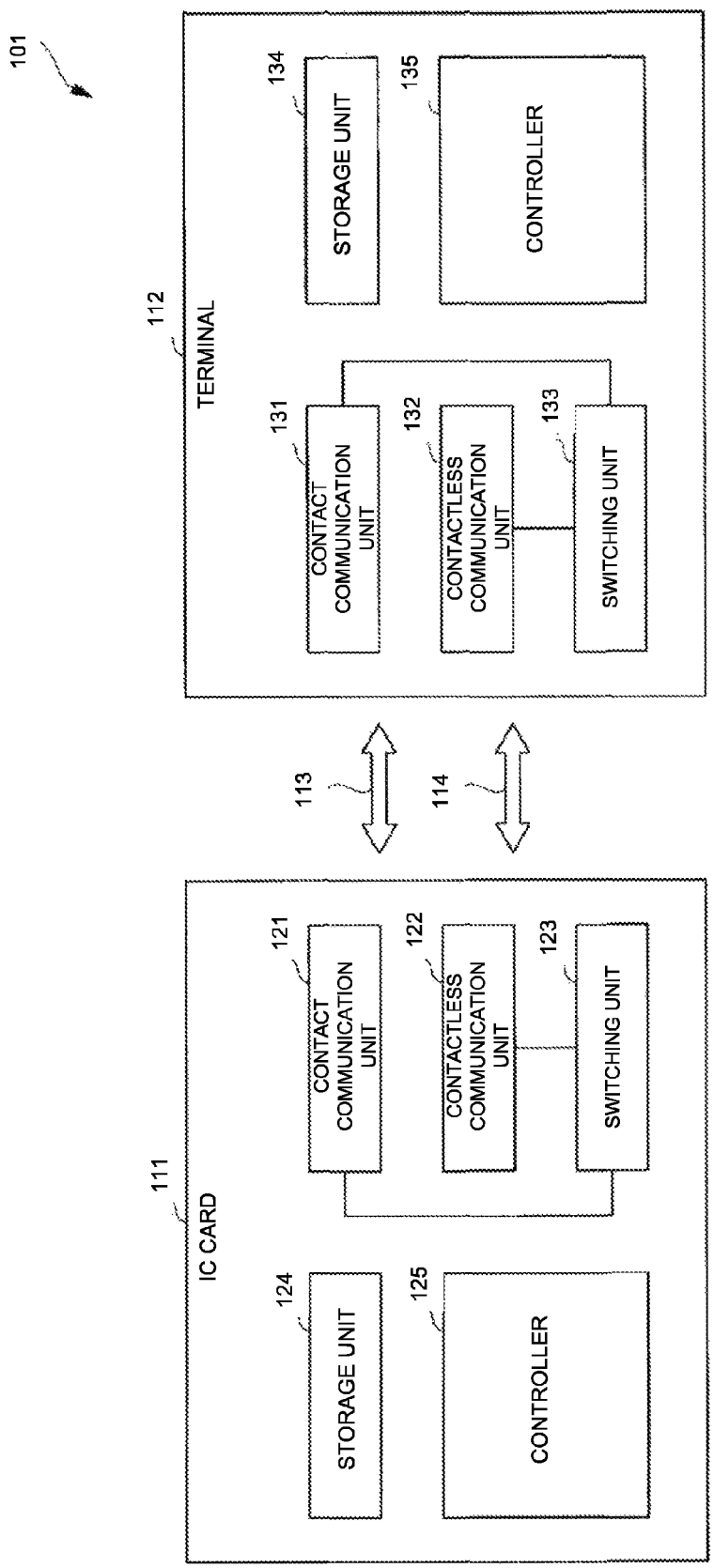
FIG. 9 is a diagram illustrating a communication system of an embodiment.

FIG. 9 is a diagram illustrating a communication system 101 of this embodiment.

The communication system 101 includes an IC card 111 and a terminal 112. The IC card 111 and the terminal 112 communicate with each other through a wired communication channel 113 or a wireless communication channel 114.

The IC card 111 includes a contact communication unit 121, a contactless communication unit 122, a switching unit 123, a storage unit 124, and a controller 125.

The terminal 112 includes a contact communication unit 131, a contactless communication unit 132, a switching unit 133, a storage unit 134, and a controller 135.

In this embodiment, the IC card 111 is configured to response only to a command transmitted from the terminal 112. Further, as another example of the configuration, the IC card 111 may be configured to perform operations other than the response to the command transmitted from the terminal 112.

The IC card 111 will be described.

The IC card 111 interprets a command from an external terminal 12 and executes a process according to the command, and gives a response to the terminal 12 with the result of the process.

The IC card 111 includes one IC chip that is buried in the IC card 111. In the IC chip, the communication unit (the contact communication unit 121 and the contactless communication unit 122), the switching unit 123, the storage unit 124, and the controller 125 are formed.

The contact communication unit 121 communicates with the contact communication unit 131 of the terminal 112 in the contact manner through the wired communication channel 113.

The contactless communication unit 122 communicates with the contactless communication unit 132 of the terminal 112 in the contactless manner through the wireless communication channel 114.

The switching unit 123 is controlled by the controller 125, and switches the communication unit used for the communication between the contact communication unit 121 and the contactless communication unit 122.

The storage unit 124 stores programs and various types of data in the area thereof. The storage unit 124 includes, for example, a nonvolatile EEPROM (Electrically Erasable Programmable ROM) in which the stored content is rewritable, a RAM (Random Access Memory) in which data to be processed by the controller 125 is temporarily stored, and a ROM (Read Only Memory) in which a program executed by the controller 125 is stored. Further, various memories may be used as a memory storing information.

The controller 125 performs various types of processes and controls in the IC card 111. The controller 125 includes a CPU (Central Processing Unit), executes a program stored in an area of the storage unit 124, and performs various types of processes and controls. In this embodiment, the controller 125 controls the switching unit 123, and switches the communication unit used for the communication between the contact communication unit 121 and the contactless communication unit 122.

The terminal 112 will be described.

The terminal 112 is a read/write (R/W) terminal that communicates with the IC card 111, and serves as an external terminal for the IC card 111.

The contact communication unit 131 communicates with the contact communication unit 121 of the IC card 111 in the contact manner through the wired communication channel 113.

The contactless communication unit 132 communicates with the contactless communication unit 122 of the IC card 111 in the contactless manner through the wireless communication channel 114.

The switching unit 133 is controlled by the controller 135, and switches the communication unit between the contact communication unit 131 and the contactless communication unit 132.

The storage unit 134 stores programs and various types of data in the area thereof. The storage unit 134 includes, for example, a nonvolatile EEPROM in which the stored content is rewritable, a RAM in which data to be processed by the controller 135 is temporarily stored, and a ROM in which a program executed by the controller 35 is stored. Further, various memories may be used as a memory storing information.

The controller 135 performs various types of processes and controls in the terminal 112. The controller 135 includes a CPU, executes a program stored in an area of the storage unit 134, and performs various types of processes and controls. In this embodiment, the controller 135 controls the switching unit 133, and switches the communication unit used for the communication between the contact communication unit 131 and the contactless communication unit 132.

Herein, the IC card 111 and the terminal 112 each include both of the contact interface (the interface of the contact communication units 121 and 131) and the contactless interface (the interface of the contactless communication units 122 and 132). In this embodiment, the IC card 111 is the combination card.

In the contact manner, the terminal 112 and the IC card 111 communicate with each other in a state where a metal contact point provided in the terminal 112 and a metal contact point provided in the IC card 111 come in contact with each other. In this case, a conductive path (a wired path) connecting the terminal 112 and the IC card 111 which are connected through the contact points becomes the wired communication channel 113. The terminal 112 includes a slot for the contact communication in which the metal contact points come in contact with each other when the IC card 111 is inserted.

In the contactless manner, the terminal 112 and the IC card 111 communicate with each other by electromagnetic induction between an antenna provided in the terminal 112 and an antenna provided in the IC card 111. The antennas provided in the IC card 111 and the terminal 112 are, for example, loop antennas. In this case, a path (wireless path) in the air where the electromagnetic induction is performed becomes the wireless communication channel 114.

The terminal 12 transmits a command to the IC card 111 through a UART (Universal Asynchronous Receiver Transmitter) according to a specific protocol in order to read and rewrite information stored in the IC card 111. The IC card 111 secures, for example, the command received from the terminal 112 through the UART in a reception buffer, interprets the command secured in the reception buffer, and executes the process according to the command.

In addition, in this embodiment, the IC card 111 does not include a power source, and a configuration is used which supplies power from the terminal 112 to the IC card 111 in the contact manner or the contactless manner. As another example of the configuration, the IC card 111 may include the power source.

Figure 10:
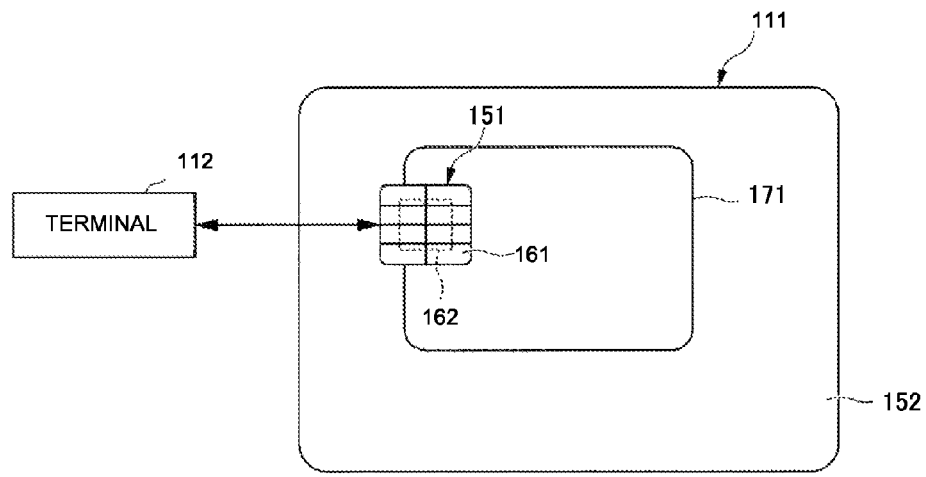
FIG. 10 is a diagram illustrating an outline of an example of the IC card of an embodiment.

FIG. 10 is a diagram illustrating an example of the outline of the IC card 111 of an embodiment.

As illustrated in FIG. 10, the IC card 111 includes an IC module 151. The IC module 151 includes a contact portion 161, and an IC chip 162 is provided therein. The IC card 111 is formed, for example, by mounting the IC module 151 on a plastic card substrate 152 (an example of the card body). In this way, the IC card 111 includes the card substrate 152 and the IC module 51 which is embedded in the card substrate 152. In addition, the IC card 111 can communicate with the terminal 12 (an external apparatus) through the contact portion 161.

The IC card 111 receives, for example, the command (the process request) transmitted from the terminal 112 through the contact portion 161, and executes the process (the command process) according to the received command. Then, the IC card 111 transmits the response (the process response) obtained as a result of the command process to the terminal 112 through the contact portion 161.

Herein, the terminal 112 is a host apparatus, for example, a reader/writer, communicating with the IC card 111, and may be another apparatus.

The IC module 151 is sold, for example, in a type of COT (Chip On Tape) which is formed by arranging a plurality of the IC module 151 on a tape.

The contact portion 161 includes terminals of various signals necessary for the operation of the IC card 111. Herein, the terminals of various signals, for example, include terminals for receiving signals, such as a power source voltage, a clock signal, and a reset signal, supplied from the terminal 112, and the serial data input/output terminal (the SIO terminal) for communicating with the terminal 112. The terminals receiving the signals supplied from the terminal 112 include a power source terminal (the VDD terminal and the GND terminal), a clock signal terminal (the CLK terminal), and a reset signal terminal (the RST terminal).

The IC chip 162 is, for example, an LSI (Large Scale Integration) element such as a one-chip microprocessor.

In addition, as illustrated in FIG. 10, the IC card 111 includes an antenna 71. The antenna 171 is, for example, a loop antenna.

As described above, the IC card 111 can communicate with the terminal 112 in the contact manner using the contact portion 161, and can communicate with the terminal 112 in the contactless manner using the antenna 171.

Further, FIG. 10 illustrates an example of the outline of the IC card 11. The IC card 111 may include other circuits as needed.

In this way, the IC card 111 of this embodiment includes the card substrate 152 in which the antenna 171 is provided, and the IC module 151 which is embedded in the card substrate 152 and provided with the IC chip 162 and the contact portion 161.

In this embodiment, the IC module 151 includes the contact communication unit 121, the contactless communication unit 122, the switching unit 123, the storage unit 124, and the controller 25.

In this embodiment, the contact communication unit 121 performs the communication in the contact manner using the contact portion 161. The contactless communication unit 122 performs the communication in the contactless manner using the antenna 71.

Figure 11:
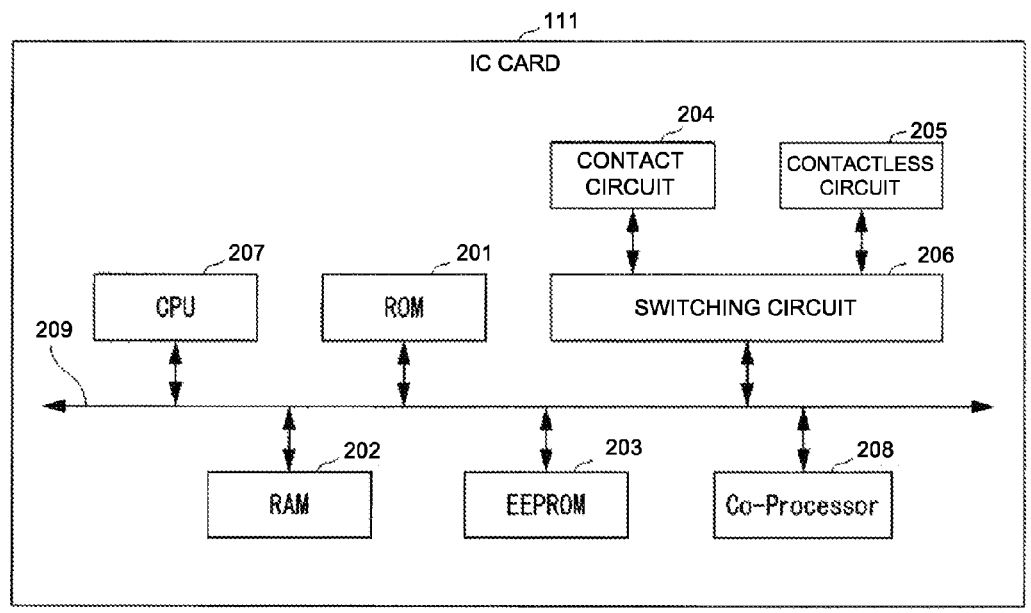
FIG. 11 is a diagram illustrating an example of a hardware configuration of the IC card of an embodiment.

FIG. 11 illustrates an example of a hardware configuration of the IC card 111 of an embodiment.

The IC card 111 includes a ROM 201, a RAM 202, an EEPROM 203, a contact circuit 204, a contactless circuit 205, a switching circuit 206, a CPU 207, a co-processor 208, and a system bus 209 that is used to connect these components. In this embodiment, the RAM 202 is provided with a reception buffer (not illustrated) in which the information of the command transmitted from the terminal 112 is secured. Further, the RAM 202 may be provided with a transmission buffer in which the information of the response transmitted to the terminal 112 is secured, and a work buffer in which the information is secured when various works are performed.

Herein, in the example of FIG. 11, the IC card 111 is provided with the co-processor 208 that executes a specific process (in this embodiment, a process of encrypting data, and a process of decrypting the encoded data) for supporting the CPU 207. As another example of the configuration, all the processes may be executed by the CPU 207 without providing the co-processor 208 in the IC card 111.

Further, in the example of FIGS. 9 and 11, the contact communication unit 121 is realized by the function of the contact circuit 204. The contactless communication unit 122 is realized by the function of the contactless circuit 205. The switching unit 123 is configured by the function of the switching circuit 206. The storage unit 124 is realized by the functions of the ROM 201, the RAM 202, and the EEPROM 203. The controller 25 is realized by the functions of the CPU 207 and the co-processor 208.

The switching between the contact manner communication and the contactless manner communication in the IC card 111 will be described. As an example, a format of the command transmitted from the terminal 112 to the IC card 111 and a format of the communication sequence are defined in ISO/IEC 7816-3.

When the IC card 111 is activated in a defined setup sequence by the contact interface provided in the terminal 12, the IC card 111 transmits the initial response ATR (Answer to Reset) to the terminal 112.

Figure 12:
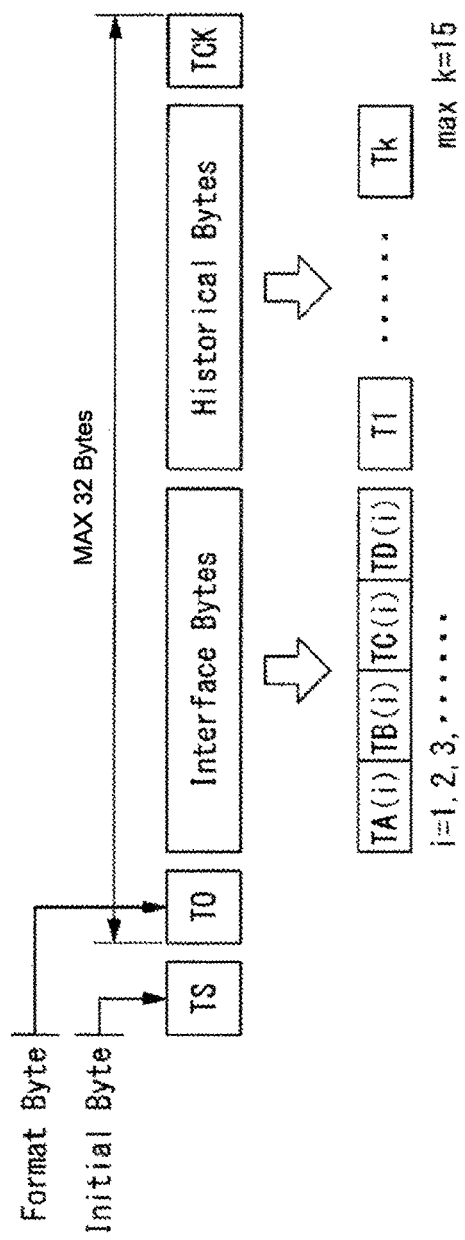
FIG. 12 is a diagram illustrating an example of a data format of an ATR of an embodiment.

FIG. 12 illustrates an example of a data format of the ATR of an embodiment.

In the example of FIG. 12, the ATR contains an initial byte TS, a format byte T0, interface bytes TA(i), TB(i), TC(i), and TD(i) (herein, i=1, 2, 3, . . . ), historical bytes T1 to Tk (herein, max k=15) related to information management, and a check parameter TCK. The data bytes T0 to TCK have 32 bytes at a maximum.

In this embodiment, the IC card 111 is, for example, manually inserted by a user into the slot for the contact communication of the terminal 112 provided with both of the contact interface (the interface of the contact communication unit 131) and the contactless interface (the interface of the contactless communication unit 132). Then, the terminal 112 makes the contact communication unit 131 activate the IC card 111 through the contact interface. The terminal 112 makes the contactless communication unit 132 generate a magnetic field for the communication with the IC card 111 in the contactless manner.

At this time, the controller 125 of the IC card 111 determines (confirms) whether the magnetic field generated by the terminal 112 is applied to the contactless communication unit 122 (whether the contactless communication unit 122 receives the magnetic field).

As a specific example, the IC card 111 contains an LSI (Large Scale Integration) element that includes a rectifying circuit in the contactless communication unit 22. When the magnetic field generated by the terminal 112 is applied, the rectifying circuit generates a voltage obtained by converting the magnetic field into a direct current (DC). Then, in a case where the controller 25 of the IC card 111 determines that the voltage generated by the rectifying circuit is equal to or more than a predetermined threshold (or exceeding the predetermined threshold), the controller 125 determines that the magnetic field generated by the terminal 112 is applied to the contactless communication unit 122. On the other hand, in the other case, the controller 125 of the IC card 111 determines that the magnetic field from the terminal of a communication partner in the contact manner is not applied to the contactless communication unit 22 (for example, the magnetic field is not generated because the terminal of the communication partner in the contact manner has no contactless interface).

As a result of the above determination, when the IC card 111 is activated by the terminal (for example, a terminal which includes the contact interface but not the contactless interface) in the contact manner, the controller 125 of the IC card 111 determines that the magnetic field from the terminal is not applied to the contactless communication unit 122. In this case, the IC card 111 keeps on communicating with the terminal in the contact manner by the contact communication unit 121.

On the other hand, as a result of the above determination, when the IC card 111 is activated by the terminal (for example, the terminal 112 which includes both of the contact interface and the contactless interface), the controller 125 of the IC card 111 determines that the magnetic field from the terminal 112 is applied to the contactless communication unit 22. In this case, the controller 125 of the IC card 111 adds information about the contactless manner communication (contactless communication information) to the ATR to be transmitted to the terminal 112 in the contact manner. The contactless communication information is information which is sent from the IC card 111 to the terminal 112 to command the switching to the contactless manner communication. Various types of information may be employed as the contactless communication information. The contactless communication information contains, for example, information on the contents for commanding the switching to the contactless manner communication. The contactless communication information may contain, as the information or another information, information on the contents for informing the standard of the contactless manner which is supported by the subject apparatus (the IC card 111), or information on the contents for designating a standard of the contactless manner which is used by the subject apparatus (the IC card 111), or the like. The IC card 111 adds the contactless communication information to, for example, the historical data of the ATR to include the contactless communication information in the historical data of the ATR.

When the controller 135 of the terminal 112 detects that the contactless communication information is contained in the ATR received in the contact manner from the IC card 111 activated in the contact manner, the controller 135 deactivates the IC card 111, which was activated in the contact manner, in the contact manner, switches the interface to be used from the contact interface to the contactless interface, activates the IC card 111 in the contactless manner, and starts the communication with the IC card 111 in the contactless manner.

Herein, in a case where the controller 135 of the terminal 112 detects that the information such as the standard of the contactless manner is contained in the contactless communication information received from the IC card 111, the terminal communicates with the IC card 111 in the contactless manner matching with the standard for example.

Further, even though both of the contact interface and the contactless interface are provided, there may be a terminal which has no function of switching the communication from the contact manner to the contactless manner in accordance with the contactless communication information being received from the IC card 111 in the contact communication. In a case where such a terminal is a communication partner in the contact communication, even when the IC card 111 transmits the contactless communication information to the terminal, the terminal does not switch the communication to the contactless manner. In this case, the IC card 111 keeps on communicating with the terminal in the contact manner by the contact communication unit 121.

For example, the standard of the contactless manner is ISO/IEC 14443 TypeA/TypeB or FeliCa (registered trademark).

Herein, an example of the switching from the contact manner to the contactless manner performed by the terminal 112 and the IC card 111 of this embodiment will be described.

The terminal 112 is set to turn on a function of activating the IC card 111 by the contact communication unit 131 (for example, the power supplied through an electric signal therefrom) and a function of activating the IC card 111 by the contactless communication unit 132 (for example, the power supplied through the magnetic field therefrom). Then, the controller 135 of the terminal 112 controls the switching unit 33 to switch the communication unit in order to use the communication unit (the contact communication unit 131 or the contactless communication unit 132) where the response from the IC card 111 is received for the communication. In addition, in a case where a predetermined command (a command to switch the communication from the contact manner to the contactless manner) is received from the IC card 111 when the terminal 112 communicates with the IC card 111 in the contact manner, the controller 135 of the terminal 112 controls the switching unit 133 to switch the communication unit in order to use the contactless communication unit 132 for the communication.

In the IC card 111, in the initial state, the switching unit 123 is controlled to use the contact communication unit 21 for the communication. Then, in a case where the IC card 111 communicates with the terminal 112 in the contact manner, the IC card 111 uses the contact communication unit 121 for the communication without any change. In addition, in a case where the IC card 111 communicates with the terminal 112 in the contactless manner from the beginning not in the contact manner, or in a case where the IC card 111 communicates with the terminal 112 in the contactless manner after communicating with the terminal in the contact manner, the controller 125 of the IC card 111 controls the switching unit 123 to switch the communication unit in order to use the contactless communication unit 122 for the communication.

Figure 13:
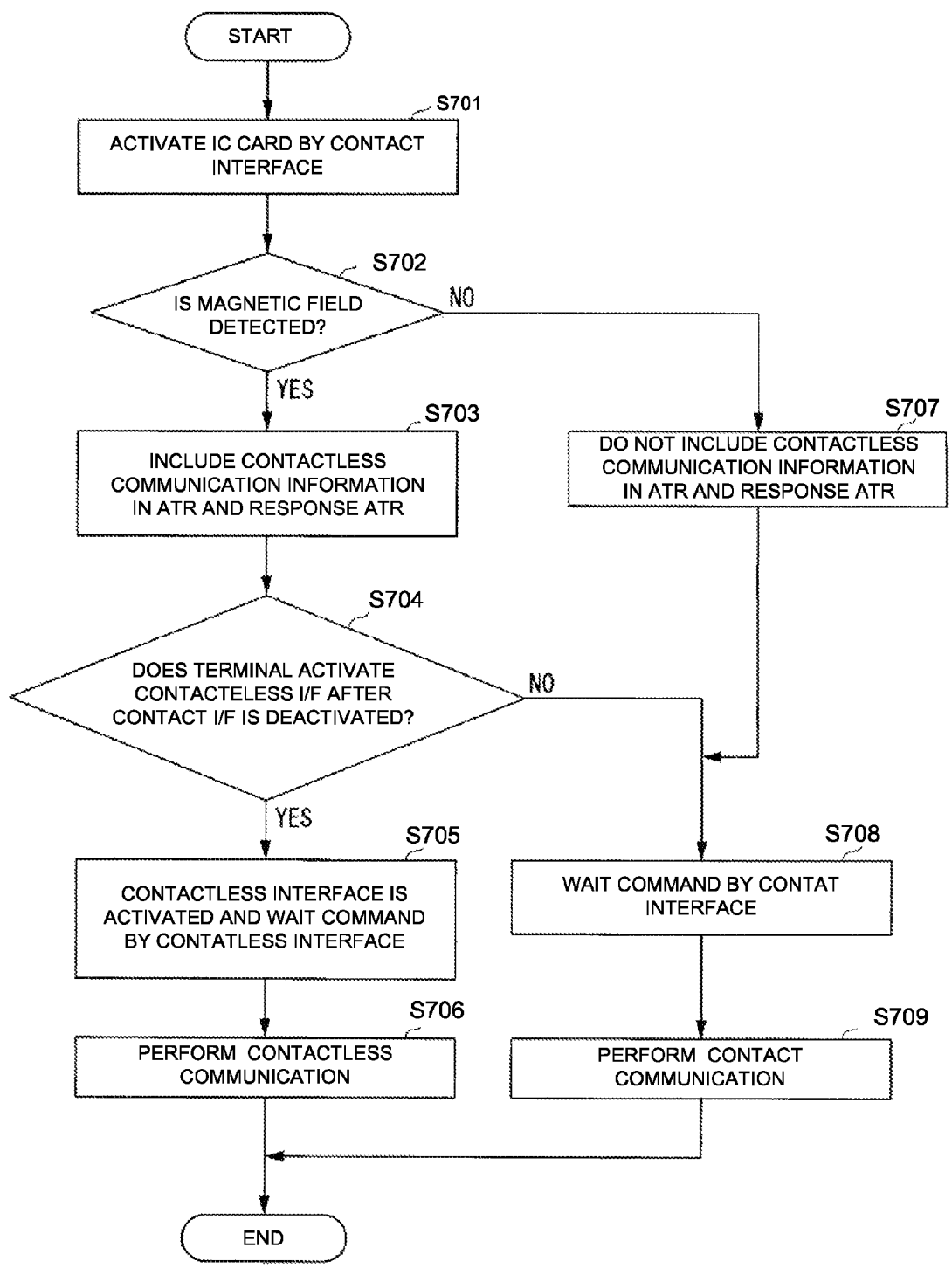
FIG. 13 is a flowchart illustrating an example of a sequence of a process performed in a communication system of an embodiment.

FIG. 13 is a flowchart illustrating an example of a sequence of a process performed in the communication system 101 of an embodiment.

(Step S701)

When a user of the IC card 111 inserts the IC card 111 into the slot for the contact communication of the terminal 112, the IC card 111 and the terminal 112 enter a state of communication enabled in the contact manner. Then, the terminal 112 activates the IC card 111 by the contact interface.

(Step S702)

When the contact communication of the contact communication unit 121 is activated by the contact interface, the controller 125 of the IC card 111 determines whether the contactless communication unit 122 receives a magnetic field (herein, the magnetic field in the contactless manner from the terminal 112) from the outside.

As a result of the determination, in a case where it is determined that the magnetic field is received from the outside (YES), the IC card 111 transfers the process to Step S703. In addition, in a case where it is determined that the magnetic field is not received from the outside (that is, a case where it is not determined that the magnetic field is received from the outside) (NO), the IC card 111 transfers the process to Step S707.

(Step S703)

In a case where it is determined that the magnetic field is received from the outside, the IC card 111 includes the contactless communication information (information containing a command to switch the communication to the contactless interface) in the ATR which is the initial response in the contact manner communication with the terminal 12 by the controller 25. The ATR is transmitted to the terminal 12 in the contact manner communication by the contact communication unit 21.

(Step S704)

Next, the terminal 112 receives the ATR transmitted from the IC card 111 in the contact manner communication by the contact communication unit 31. Then, in a case where the contactless communication information from the IC card 111 is contained in the ATR, the terminal 112 detects the contactless communication information by the controller 135. Therefore, the terminal 112 deactivates the IC card 111 with respect to the contact interface by the control of the controller 135. Thereafter, the switching unit 133 performs the switching to activate the IC card 111 in the contactless interface. In this case, the IC card 111 is deactivated with respect to the contact interface, and then activated with respect to the contactless interface. At this time, the IC card 111 is controlled by the controller 25 to be switched by the switching unit 123 from a state of performing the communication by the contact communication unit 121 to a state of performing the communication by the contactless communication unit 12. Then, the IC card 111 transfers the process to Step S705.

On the other hand, in a case where the terminal (for example, a terminal having no function of switching the communication from the contact manner to the contactless manner) does not deactivate the IC card 111 with respect to the contact interface so as not to activate the IC card 111 in the contactless interface, the IC card 111 transfers the process to Step S708. Further, such a situation may occur, for example, even in a case where an error is issued in a switching process from the contact manner to the contactless manner in the terminal 112.

(Step S705)

When the IC card 111 is activated by the contactless interface after being deactivated with respect to the contact interface by the terminal 112, the IC card 111 waits for a command transmitted from the terminal 112 by the contactless interface.

(Step S706)

Then, the IC card 111 communicates with the terminal 112 in the contactless manner by the contactless communication unit 22. Thereafter, the process of this flow is ended.

(Step S707)

In the process of Step S702, in a case where it is determined that the magnetic field is not received from the outside, the IC card 111 transmits a normal ATR to the terminal 112 in the contact manner communication by the contact communication unit 121. Then, the IC card 111 transfers the process to Step S708. Herein, the normal ATR is an ATR that contains no contactless communication information.

(Step S708)

The IC card 111 waits to receive a command from the terminal 112 established in the contact manner communication by the contact interface without any change.

(Step S709)

The IC card 111 communicates with the terminal 112 in the contact manner by the contact communication unit 121. Thereafter, the process of this flow is ended.

In the embodiment described above, the IC card is used as an example of the portable electronic apparatus. With this regard, in another example of the configuration, as the portable electronic apparatus, various types of portable electronic apparatuses such as an IC tag, a passport having an embedded IC, and a license having an embedded IC may be applied instead of the IC card. A program (a program executable in a computer) may be provided.

In the embodiment, the IC card 111 adds information (the contactless communication information) related to the contactless manner communication to the ATR which is the initial response to the terminal 112. With this regard, as another example of the configuration, the IC card 111 may add the contactless communication information to a signal other than the ATR and transmit the signal to the terminal 112. As an example, the terminal 112 may transmit a command to inquire about whether the communication by the contactless manner to the IC card 111 at a predetermined timing (for example, a periodic timing). The IC card 111 may add the contactless communication information to a signal of the response to the command and transmit the signal to the terminal 112. As another example, when the IC card 111 communicates with the terminal 112 in the contact manner, the IC card 111 may spontaneously transmit the signal containing the contactless communication information to the terminal 12.

Further, as another example of the configuration, another communication function using an LED (Light Emitting Diode) or the like (a communication function other than the contact manner and the contactless manner in this embodiment) is provided in each of the IC card 111 and the terminal 112. With the communication function, the signal containing the contactless communication information may be transmitted from the IC card 111 to the terminal 112.

According to the embodiment, the IC card 111 includes the IC module 151 which is provided with the IC chip 152 and the contact portion 161, and a main body (in this embodiment, the card substrate 152) which is provided with the antenna 171. The IC module 151 includes the contact communication unit 121 which communicates with the terminal 112 in the contact manner using the contact portion 161, the contactless communication unit 122 which communicates with the terminal 112 in the contactless manner by the magnetic field generated from the terminal 112 using the antenna 171, and the controller 125 which transmits information related to the contactless manner communication by the contactless communication unit 122 to the terminal 112 by the contact communication unit 121 in a case where the contactless communication unit 122 receives the magnetic field when the contact communication unit 121 communicates with the terminal 112 in the contact manner.

Therefore, by performing a command to switch the communication from the contact manner to the contactless manner to the terminal 112 in the IC card 111, it is possible to realize the switching from the contact manner to the contactless manner in which the communication can be made at high speed. In this embodiment, for example, in a case where a large capacity of data is transmitted between the IC card 111 and the terminal 112, a communication time can be shortened. In addition, in this embodiment, for example, in a case where a communication error easily occurs due to a contact failure in the contact manner communication between the IC card 111 and the terminal 112, it is possible to secure stability in the communication by switching the communication from the contact manner to the contactless manner. As a specific example, the communication system 101 according to this embodiment can be applied to a field where a large capacity of data are handled, such as a transponder of an electronic toll collection system (ETC) (ETC transponder) or a system for handling biological data such as face data or fingerprint data.

In this way, the IC card 111 of this embodiment can take advantage of the contactless manner communication.

According to the embodiment, in the IC card 111, the information related to the contactless manner communication by the contactless communication unit 122 contains information (in this embodiment, information for specifying the standard of the communication manner) for specifying the communication manner.

Therefore, the IC card 111 can indicate a communication manner (in this embodiment, the standard of the communication manner) desired (or, corresponding thereto) by the IC card 111 itself with respect to the terminal 112.

According to the embodiment, in the IC card 111, the controller 125 transmits the information related to the contactless manner communication by the contactless communication unit 22 as an initial response to the terminal 112.

Therefore, in the IC card 111, the command to switch the communication to the contactless manner to the terminal 112 is performed at the stage of the initial response in the contact manner communication, so that it is possible to realize the switching to the contactless manner communication at the initial stage.

According to the embodiment, the IC module 151 includes the contact communication unit 121 which communicates with the terminal 112 in the contact manner (using the contact portion 161), the contactless communication unit 122 which communicates with the terminal 112 in the contactless manner by the magnetic field generated from the terminal 112 (using the antenna 171), and the controller 125 which transmits the information related to the contactless manner communication by the contactless communication unit 122 to the terminal 112 by the contact communication unit 121 in a case where the contactless communication unit 122 receives the magnetic field when the contact communication unit 121 communicates with the terminal 112 in the contact manner.

Therefore, the IC module 151 of this embodiment can take advantage of the contactless manner communication.

According to the embodiment, the terminal 112 includes the contact communication unit 131 which communicates with the IC card 111 in the contact manner, the contactless communication unit 132 which generates the magnetic field and communicates with the IC card 111 by the magnetic field in the contactless manner, and the controller 135 which controls the communication with the IC card 111 such that the contact manner communication by the contact communication unit 131 is stopped and the contactless manner communication by the contactless communication unit 132 is started in a case where the contact communication unit 131 receives the information related to the contactless manner communication from the IC card 111 when the contact communication unit 131 communicates with the IC card 111 in the contact manner.

Therefore, the terminal 12 of this embodiment can take advantage of the contactless manner communication.

According to this embodiment described above, the IC card 111 includes the IC module 151 which is provided with the IC chip 152 and the contact portion 611 and a main body (in this embodiment, the card substrate 152) which is provided with the antenna 171. In addition, the IC module 151 includes the contact communication unit 21 which communicates with the terminal 112 in the contact manner using the contact portion 161, the contactless communication unit 122 which communicates with the terminal 112 in the contactless manner by the magnetic field generated from the terminal 112 using the antenna 171, and the controller 125 which transmits the information related to the contactless manner communication by the contactless communication unit 122 to the terminal 112 using the contact communication unit 121 in a case where the contactless communication unit 122 receives the magnetic field when the contact communication unit 121 communicates with the terminal 112 in the contact manner. Therefore, the IC card 111 can take advantage of the contactless manner communication.

The functions of the respective configurations in each apparatus (for example, the IC card 1, the portable terminal 2, the IC card 111, and the terminal 112) according to each embodiment described above may be realized by a program which is stored in a computer-readable recording medium. Therefore, the processes in the functions of each apparatus can be performed by reading the program stored in the recording medium into the computer and executing the program.

Further, herein, the expressing "reading the program stored in the recording medium into the computer and executing the program" includes installation of the program in a computer system. The "computer system" described herein may be a system containing an operating system (OS) or a hardware configuration such as peripheral devices.

In addition, the "computer system" may include a plurality of computers which are connected to each other through the Internet, a network such as a WAN, a LAN, and a dedicated line. In addition, the "computer-readable recording medium" means a flexible disk, a magneto-optical disk, a ROM, a rewritable nonvolatile memory such as a flash memory, a portable medium such as a DVD (Digital Versatile Disk), and a memory device such as a hard disk built in the computer system.

Furthermore, the "computer-readable recording medium" includes a recording medium which stores the program for a predetermined time period, for example, a volatile memory (for example, a dynamic random access memory (DRAM)) in a client computer system or a server transmitting the program through a communication line such as a network (the Internet) or a telephone line.

In addition, the program may be transferred from the computer system having the program stored in the memory system toward another computer system through a transmission medium or a transmission wave of the transmission medium. Herein, the "transmission medium" which transfers the program means a medium having a function of transferring information, like a network (communication network) such as the Internet or a communication line (communication wire) such as a telephone line.

In addition, the program may be used to realize some of the functions described above. Furthermore, the program may be a so-called differential file (differential program) which can realize the above-mentioned functions by being combined with a program already stored in the computer system.

In this way, each functional unit may be a software functional unit or a hardware functional unit such as an LSI.

The invention has been described using some embodiments, but these embodiments are given only as an example not intended to limit the scope of the invention. These embodiments can be implemented in various forms, and omissions, replacements, and changes can be variously made in a scope not departing from the spirit of the invention. These embodiments and modifications thereof are included in the scope and the spirit of the invention, and also included in a scope described in claims and the equivalents thereof.

What is claimed is:
1. An IC card comprising:
a communication unit that includes a first interface and a second interface, and that is capable of communicating with an external device;
a controller that executes a command received by the communication unit, and that makes the communication unit transmit a response to the command; and
a storage unit,
wherein the controller is configured to receive a first command from the external device by the first interface execute the first command received, when the communication unit cannot output a first response that is a processing result of the first command by the first interface to the external device, store the first response to the storage unit as a discontinued response, and when the communication unit receives a special command to request for transmitting the discontinued response from the external device by the second interface, read out the discontinued response from the storage unit and make the communication unit transmit a response containing the discontinued response as a response to the special command by the second interface to the external device.
2. The IC card according to claim 1,
wherein the controller unit determines whether or not the discontinued response is stored in the storage unit when the communication unit receives an arbitrary command other than the special command from the external device by the second interface, and
wherein the controller makes the communication unit transmit, to the external device, a response containing discontinuation information indicating that the communication unit could not output the first response to the external device, as a response to the arbitrary command, by the second interface if the controller determines that the discontinued response is stored in the storage unit.
3. The IC card according to claim 2,
wherein the controller makes the communication unit transmit the response containing the discontinuation information when the arbitrary command is normally ended.
4. The IC card according to claim 1,
wherein the controller deletes the discontinued response from the storage unit after transmitting the response containing the discontinued response.

* * * * *